(12) United States Patent
Lieberman et al.

(10) Patent No.: US 10,831,155 B2
(45) Date of Patent: Nov. 10, 2020

(54) SYSTEMS AND METHODS FOR FABRICATING VARIABLE DIGITAL OPTICAL IMAGES USING GENERIC OPTICAL MATRICES

(71) Applicant: NANOGRAFIX CORPORATION, San Diego, CA (US)

(72) Inventors: Daniel Lieberman, San Diego, CA (US); Or Lieberman, San Diego, CA (US); Rami Lieberman, San Diego, CA (US)

(73) Assignee: NANOGRAFIX CORPORATION, San Diego, CA (US)

( * ) Notice: Subject to any disclaimer, the term of this patent is extended or adjusted under 35 U.S.C. 154(b) by 262 days.

(21) Appl. No.: 15/549,473

(22) PCT Filed: Feb. 9, 2016

(86) PCT No.: PCT/US2016/017212
§ 371 (c)(1),
(2) Date: Aug. 8, 2017

(87) PCT Pub. No.: WO2016/130592
PCT Pub. Date: Aug. 18, 2016

(65) Prior Publication Data
US 2018/0024497 A1 Jan. 25, 2018

Related U.S. Application Data

(63) Continuation of application No. 14/634,648, filed on Feb. 27, 2015, now Pat. No. 9,176,473, and a
(Continued)

(51) Int. Cl.
*G03H 1/04* (2006.01)
*G06K 15/02* (2006.01)
(Continued)

(52) U.S. Cl.
CPC .......... *G03H 1/0443* (2013.01); *B42D 25/305* (2014.10); *B42D 25/328* (2014.10);
(Continued)

(58) Field of Classification Search
CPC .. G03H 1/0443; G03H 1/0011; G03H 1/0276; G03H 1/04; G03H 2001/0016;
(Continued)

(56) References Cited

U.S. PATENT DOCUMENTS

| 5,138,471 A | 8/1992 | McGrew |
| 5,396,839 A | 3/1995 | Rice |

(Continued)

FOREIGN PATENT DOCUMENTS

| DE | 102005032997 A1 | 1/2007 |
| EP | 0375833 A | 7/1990 |

(Continued)

OTHER PUBLICATIONS

PCT/US2016/017212 International Search Report and Written Opinion dated May 6, 2016.
(Continued)

*Primary Examiner* — Robert E. Tallman
(74) *Attorney, Agent, or Firm* — LeonardMeyer LLP

(57) ABSTRACT

Variable digital optical images may be fabricated using generic optical matrices. A generic optical matrix may have pixels corresponding to color and subpixels corresponding to noncolor effects. The pixels may include first pixels corresponding to a first color and second pixels corresponding to a second color. The subpixels may include first subpixels corresponding to a first noncolor effect and second subpixels corresponding to a second noncolor effect. Individual ones of the pixels and/or subpixels of the generic optical matrix may be obliterated according to a negative while remaining pixels and/or subpixels may be preserved.

(Continued)

The remaining pixels and/or subpixels may form an optical image corresponding to a base image. The optical image may be colored based on the remaining pixels. The optical image may exhibit noncolor effects corresponding to the remaining subpixels. The optical image may comprise a hologram or a stereo image.

11 Claims, 20 Drawing Sheets

Related U.S. Application Data continuation of application No. 14/634,663, filed on Feb. 27, 2015, now Pat. No. 9,176,328, and a continuation of application No. 14/634,671, filed on Feb. 27, 2015, now Pat. No. 9,188,954, and a continuation of application No. 14/876,680, filed on Oct. 6, 2015, now abandoned, and a continuation of application No. 14/930,494, filed on Nov. 2, 2015, now abandoned.

(60) Provisional application No. 62/114,012, filed on Feb. 9, 2015, provisional application No. 62/114,014, filed on Feb. 9, 2015, provisional application No. 62/114,018, filed on Feb. 9, 2015.

(51) Int. Cl.
| | |
|---|---|
| G02B 5/20 | (2006.01) |
| G03H 1/02 | (2006.01) |
| B42D 25/328 | (2014.01) |
| B42D 25/425 | (2014.01) |
| B42D 25/305 | (2014.01) |
| G03H 1/00 | (2006.01) |
| G02B 5/32 | (2006.01) |
| G02B 30/34 | (2020.01) |
| B41J 3/407 | (2006.01) |

(52) U.S. Cl.
CPC ........... *B42D 25/425* (2014.10); *G02B 5/201* (2013.01); *G02B 5/32* (2013.01); *G03H 1/0011* (2013.01); *G03H 1/0276* (2013.01); *G03H 1/04* (2013.01); *G06K 15/02* (2013.01); *G06K 15/021* (2013.01); *G06K 15/1802* (2013.01); *G06K 15/188* (2013.01); *G06K 15/1849* (2013.01); *B41J 3/407* (2013.01); *G02B 30/34* (2020.01); *G03H 2001/0016* (2013.01)

(58) Field of Classification Search
CPC ............ G06K 15/188; G06K 15/1849; G06K 15/1802; G06K 15/02; G06K 15/021; G02B 5/32; G02B 5/201; G02B 27/2228; B42D 25/305; B42D 25/425; B42D 25/328; B41J 3/407
See application file for complete search history.

(56) References Cited

U.S. PATENT DOCUMENTS

| | | | |
|---|---|---|---|
| 5,784,200 A | 7/1998 | Modegi | |
| 5,790,703 A | 8/1998 | Wang | |
| 6,317,226 B1 | 11/2001 | Yeh et al. | |
| 6,392,768 B1 | 5/2002 | Yeh et al. | |
| 7,193,754 B2 | 3/2007 | Borgsmuller et al. | |
| 7,729,027 B2 | 6/2010 | Matsuyama | |
| 7,796,318 B2 | 9/2010 | Woodgate et al. | |
| 7,893,005 B2 | 2/2011 | Funada et al. | |
| 7,934,752 B2 | 5/2011 | Saito et al. | |
| 8,760,988 B2 | 6/2014 | Nakamura | |
| 9,188,954 B1 | 11/2015 | Lieberman | |
| 2001/0031405 A1 | 10/2001 | Phillips | |
| 2002/0102007 A1 | 8/2002 | Wang | |
| 2003/0067539 A1 | 4/2003 | Doerfel et al. | |
| 2004/0101982 A1 | 5/2004 | Woontner | |
| 2004/0252867 A1 | 12/2004 | Lan et al. | |
| 2005/0174620 A1 | 8/2005 | Woontner | |
| 2006/0098005 A1 | 5/2006 | Yung | |
| 2006/0250671 A1 | 11/2006 | Schwerdtner et al. | |
| 2007/0054436 A1 | 3/2007 | Hirakata et al. | |
| 2007/0109643 A1 | 5/2007 | Lee et al. | |
| 2007/0195391 A1 | 8/2007 | Nishikawa et al. | |
| 2008/0192343 A1 | 8/2008 | Miyawaki et al. | |
| 2008/0198468 A1 | 8/2008 | Kaule et al. | |
| 2008/0199803 A1 | 8/2008 | Matsuyama | |
| 2008/0231925 A1 | 9/2008 | Tateishi et al. | |
| 2008/0240787 A1 | 10/2008 | Saito et al. | |
| 2008/0246897 A1 | 10/2008 | Gaudreau | |
| 2008/0299332 A1 | 12/2008 | Matsuyama | |
| 2009/0251749 A1 | 10/2009 | O'Boyle et al. | |
| 2009/0303597 A1 | 12/2009 | Miyawaki et al. | |
| 2010/0110317 A1* | 5/2010 | Chen ................ | G02F 1/133553 349/15 |
| 2010/0165134 A1 | 7/2010 | Dowski, Jr. et al. | |
| 2010/0171811 A1 | 7/2010 | Kamins-Naske et al. | |
| 2011/0002019 A1 | 1/2011 | Routley et al. | |
| 2011/0187747 A1 | 8/2011 | McCarthy et al. | |
| 2011/0261154 A1 | 10/2011 | Chang | |
| 2013/0215472 A1 | 8/2013 | Rossier et al. | |
| 2013/0261782 A1 | 10/2013 | Becken et al. | |
| 2015/0219807 A1 | 8/2015 | Lochbihler | |
| 2015/0378222 A1* | 12/2015 | Matsushima ..... | G02F 1/134363 349/108 |

FOREIGN PATENT DOCUMENTS

| | | |
|---|---|---|
| JP | 2000211257 A | 8/2000 |
| JP | 2005-301066 | 10/2005 |
| JP | 2008-096653 | 4/2008 |
| JP | 2010-113327 | 5/2010 |
| WO | WO 9823979 A1 | 6/1998 |
| WO | WO 2005/002872 A1 | 1/2005 |
| WO | WO-2011119098 A1 | 9/2011 |
| WO | WO-2016130592 A1 | 8/2016 |

OTHER PUBLICATIONS

U.S. Appl. No. 14/634,648 Office Action dated Jun. 2, 2015.
EP 16 74 9745 European Search Report on Patentability dated Feb. 13, 2019.
EP 16 74 9745 European Search Report on Patentability dated Oct. 9, 2018.

* cited by examiner

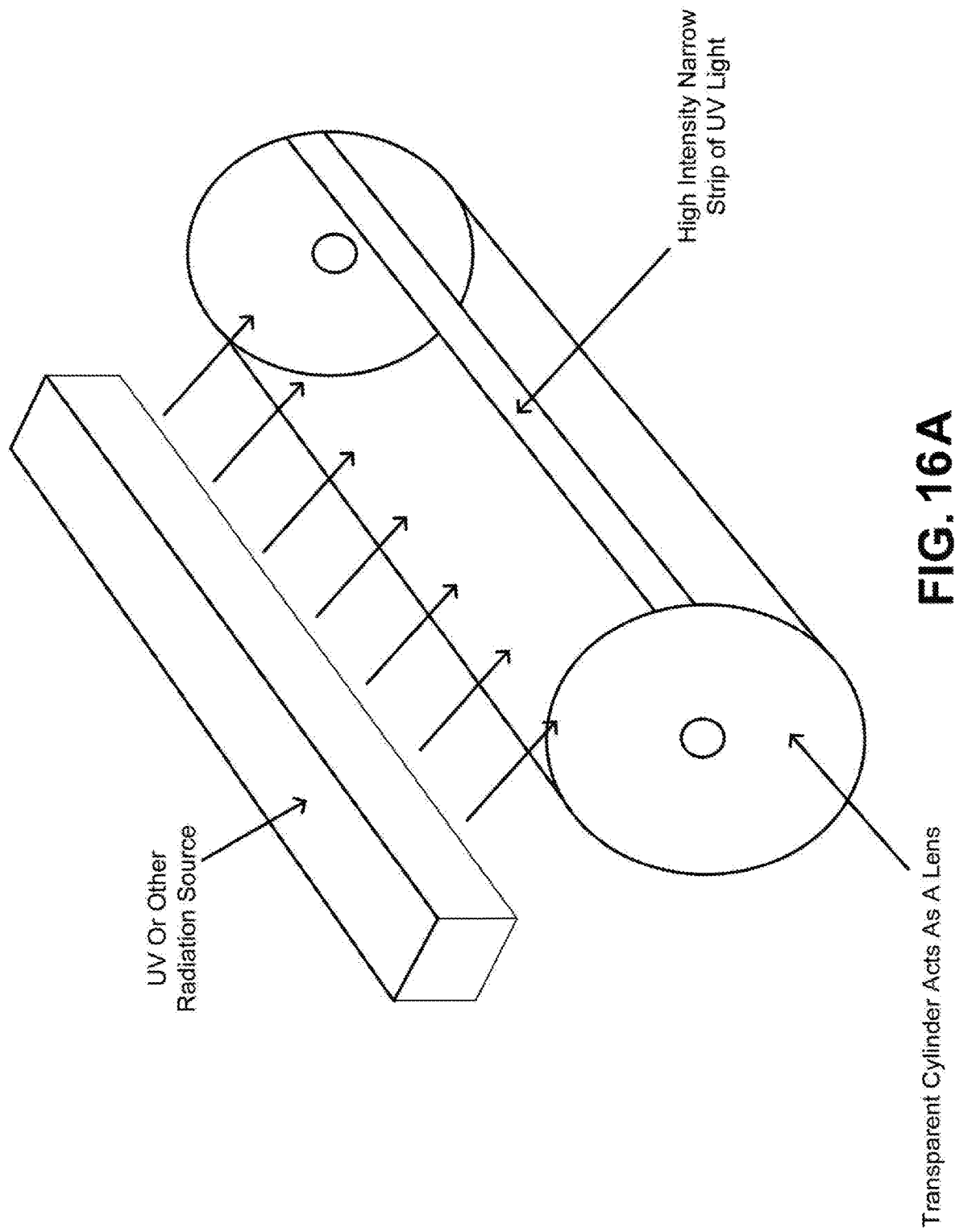

SYSTEMS AND METHODS FOR FABRICATING VARIABLE DIGITAL OPTICAL IMAGES USING GENERIC OPTICAL MATRICES

FIELD OF THE DISCLOSURE

This disclosure relates to generic optical matrices having pixels corresponding to color and sub-pixels corresponding to non-color effects, and associated methods; generating negatives of variable digital optical images based on desired images and generic optical matrices; and fabricating variable digital optical images using generic optical matrices.

BACKGROUND

Optical images that create two-dimensional and/or three-dimensional effects may typically be printed using lenticular lens techniques, holographic techniques, and/or stereographic techniques. As these different techniques have come to be used more and more, a need has arisen in the printing industry for the capability of generating such images quickly and at low cost and of integrating them into ink printing machinery so that they can easily be incorporated in printed materials such as labels, packaging, security printouts, and/or other printed materials. As it presently stands, these techniques generally involve long production waiting times and limited to specialized companies such as holographic companies.

Indeed, to date, the implementation of optical images that create two-dimensional and/or three-dimensional effects within printing applications has generally been costly and time-consuming. In the case of holograms, these may be produced by holographic companies that have very expensive equipment. The process may be slow and costly. Contemporary hologram technology may require companies that have an optical laboratory in which the hologram is made on a photoresist plate. The optical laboratory may include laser equipment, anti-vibration tables, other specialized equipment, and trained personnel. Once a hologram is initially made, it may be called a master, but it may not be used for large-scale production. As such, the company may also need an electroforming laboratory, where the photoresist master is introduced into a bath of nickel sulfamate for the purpose of cultivating a nickel copy on the surface of the photoresist. Once the nickel is of sufficient thickness, it may be separated from the photoresist copy in order to create a negative copy of the original image. It is from this nickel that the laboratory may cultivate a series of copies that may later be called nickel shims and may be used to engrave the image on a variety of supporting materials.

Next, in order to engrave the image, it may be necessary to have special equipment. Depending on the final product, there may be additional equipment for different applications. These processes often take several days and are processes that are completely distinct from ink printing. For the purpose of using these optical structures, the printers customarily rely on specialized companies (e.g., holographic companies) that generate the required images according to their needs. In addition to the investment of additional time needed to interface with those specialized companies, printers may be required to invest in equipment that enables the printer to transfer the optical structures onto their printed products.

SUMMARY

One aspect of the disclosure relates to a generic optical matrix having pixels corresponding to color and sub-pixels corresponding to non-color effects. Exemplary implementations may enable printers throughout the world to have the capability to generate optical structures as if they were an additional "ink" at an additional "ink" station in their printing equipment. Some implementations may enable printers to vary the optical image that is being printed. The generic optical matrix may be used in conjunction with a negative and a UV lacquer (or other approach) to selectively obliterate certain pixels and/or sub-pixels to instantly create an optical image that may be used to print optical images in printing equipment.

Exemplary implementations may provide to printers an ability to control all aspects of their production, including the generation of complex optical images (e.g., holograms) without having to invest in expensive and complex optics and equipment for the application thereof. In other words, exemplary implementations may facilitate continuous systems that are easily and inexpensively integrated into printers' prepress and production departments. As a result, printers may be able to supply their clients quickly with a combination of prints and complex optical images at reasonable cost during prepress and production.

Some implementations may facilitate instantly or rapidly creating optical structures on a large-scale to create many types of images without the use of laser, electroforming, expensive molds, and/or embossing equipment. Applications of these optical structures may include emphasizing the aesthetic effect of a label; providing 3D prints for augmented reality and/or virtual reality systems (e.g., Microsoft® HoloLens™); making packaging more attractive to the consumer; adding security to government documents, paper currency, credit cards, passports, labels, packaging, and/or other security applications; and/or other applications.

According to some implementations, they may facilitate recording, molding, and/or printing optical structures in such a manner that they turn out to be variable, meaning that after individual printing cycles a new and different optical image can be instantly produced. For example, an optical image may change from label to label with a purpose of increasing security of the product on which the label has been adhered, and/or with a purpose of personalizing packaging with a unique optical characteristic for individual packages. This is digital printing of optical structures.

Some implementations may be used with traditional printing equipment, digital equipment, desktop printers, and/or other equipment setups with the purpose of producing optical structures continuously or on demand with the ink printing of these machines. As such, the cost of generating these optical images may be dramatically reduced and may approach costs that are more similar to those of pre-printing in the printing industry.

In contrast to contemporary technologies for generating optical images, exemplary implementations may not require creating a new image from the ground up every time a new or altered image is desired. According to some implementations, the generic optical matrix may be used to instantly generate some type of image which can later be engraved, molded, displayed on 3D monitors or other displays, and/or be combined with prints from other printing techniques involving conventional printing equipment, rotogravure, inkjet printing, digital printing, offset printing, laser printing, desktop printers, laser coders, inkjet encoding equipment, and/or other printing techniques.

In accordance with some implementations, the generic optical matrix may have pixels corresponding to color and sub-pixels corresponding to non-color effects. The generic optical matrix may include a substrate and an array of pixels disposed on the substrate. The array may include first pixels corresponding to a first color and second pixels corresponding to a second color. The first color may be different from the second color. The first pixels and second pixels may be arranged in a motif such that individual ones of the first pixels are positioned adjacent to individual ones of the second pixels. Individual ones of the pixels may include sub-pixels. A given pixel may include a first sub-pixel and a second sub-pixel. The first sub-pixel may include an optical structure configured to reflect or transmit light meeting a first condition. The second sub-pixel may include an optical structure configured to reflect or transmit light meeting a second condition. The first condition may be different from the second condition. The light reflected or transmitted by the first sub-pixel and the second sub-pixel may be the corresponding color of the given pixel.

One aspect of the disclosure relates to a system configured for generating negatives of variable digital holographic images based on desired images and generic optical matrices. In accordance with some implementations, the system may comprise one or more physical processors configured by machine-readable instructions to obtain an original image. The one or more physical processor may be configured by machine-readable instruction to obtain a geometry associated with a generic optical matrix. The generic optical matrix may have pixels corresponding to color and sub-pixels corresponding to non-color effects. The pixels may include first pixels corresponding to a first color and second pixels corresponding to a second color. The sub-pixels may include first sub-pixels corresponding to a first non-color effect and second sub-pixels corresponding to a second non-color effect. The geometry may indicate locations and colors of pixels in the generic optical matrix. The geometry may indicate locations and non-color effects of sub-pixels within the pixels. The one or more physical processor may be configured by machine-readable instruction to perform color separation on the original image to provide two or more separations including a first separation and a second separation. The first separation may correspond to the first color. The second separation may correspond to the second color. The one or more physical processor may be configured by machine-readable instruction to index the separations to the geometry associated with the generic optical matrix to provide indexed separations. The first separation may be indexed to the geometry with respect to the first color and the first non-color effect to provide an indexed first separation associated with the first non-color effect. The first separation may be indexed to the geometry with respect to the first color and the second non-color effect to provide an indexed first separation associated with the second non-color effect. The second separation may be indexed to the geometry with respect to the second color and the first non-color effect to provide an indexed second separation associated with the first non-color effect. The second separation may be indexed to the geometry with respect to the second color and the second non-color effect to provide an indexed second separation associated with the second non-color effect. The one or more physical processor may be configured by machine-readable instruction to merge the indexed separations to provide a negative of the original image.

One aspect of the disclosure relates to a system configured for fabricating variable digital optical images using generic optical matrices. In accordance with some implementations, the system may comprise an image negative component and an image generation component. The image negative component may be configured to retain a negative corresponding to a base image. The negative may be based on the base image and a geometry associated with a generic optical matrix. The generic optical matrix may have pixels corresponding to color and sub-pixels corresponding to non-color effects. The pixels may include first pixels corresponding to a first color and second pixels corresponding to a second color. The sub-pixels may include first sub-pixels corresponding to a first non-color effect and second sub-pixels corresponding to a second non-color effect. The geometry may indicate locations and colors of pixels in the generic optical matrix. The geometry may indicate locations and non-color effects of sub-pixels within the pixels. The image generation component may be configured to obliterate individual ones of the pixels and/or sub-pixels of the generic optical matrix according to the negative while preserving remaining pixels and/or sub-pixels. The remaining pixels and/or sub-pixels may form an optical image corresponding to the base image. The optical image may be colored based on the remaining pixels. The optical image may exhibit non-color effects corresponding to the remaining sub-pixels.

According to exemplary implementations, the sub-pixels may comprise gratings (or other optical structures) in a transparent material. Individual ones of the sub-pixels may be obliterated making them transparent in order to make an underlying substrate visible through the obliterated gratings (or other optical structures). Thus, if the substrate is colored at a position that coincides with an obliterated sub-pixel, that color may be visible through the transparent material of the corresponding sub-pixel. In some implementations, individual sub-pixels may include a translucent or transparent color. Additionally, individual sub-pixels may be overprinted with transparent inks and/or translucent inks with various densities of black or other colors.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 16A illustrates an exemplary transparent cylinder that acts as a lens when illuminated in order to project a thin narrow high intensity strip of light on an opposing side of the cylinder, such as for curing purposes, in accordance with one or more implementations.

DETAILED DESCRIPTION

Figure 1:
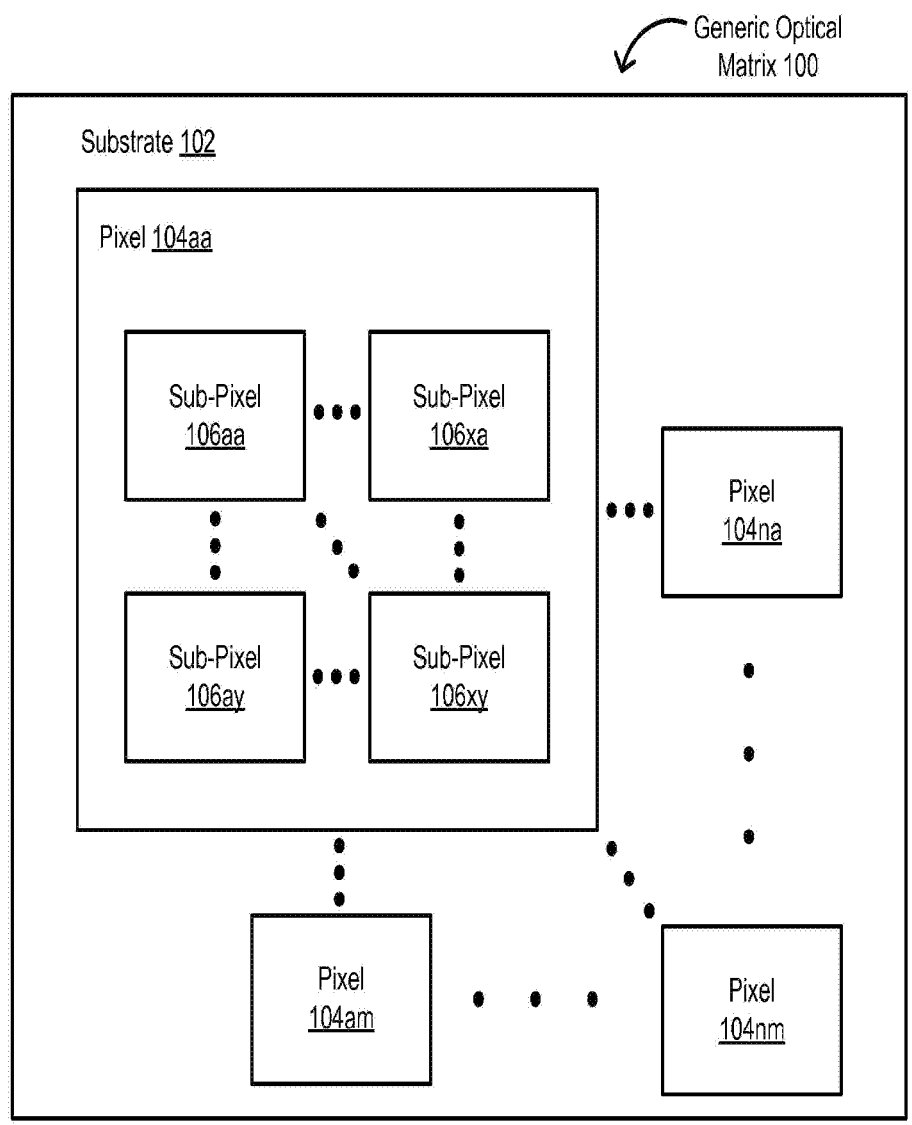
FIG. 1 illustrates a generic optical matrix having pixels corresponding to color and sub-pixels corresponding to non-color effects, in accordance with one or more implementations.

FIG. 1 illustrates a generic optical matrix 100, in accordance with one or more implementations. As depicted, the generic optical matrix 100 may include a substrate 102 with pixels 104 corresponding to color and sub-pixels 106 corresponding to non-color effects.

The substrate 102, depending on the specific implementation, may include a variety materials and/or form factors. According to various implementations, generic optical matrix 100 may be configured to reflect light (e.g., in printing applications) and/or to transmit light (e.g., in display applications). As such, substrate 102 may be transparent, translucent, and/or opaque. The substrate 102 may be flat and/or curved. The substrate 102 may be rigid, semi-rigid, and/or flexible. In some implementations, substrate 102 may include one or more of photoresist, nickel plate, polyester film, silicon, polycarbonate film, ultraviolet cured material, and/or other materials. The substrate 102 may be sized according to specific implementation. According to various implementations, substrate 102 may cover an area with one linear dimension being as small as 0.01 microns (or smaller) and/or with one linear dimension being as large as 90 inches (or larger).

The pixels 104 may be disposed on substrate 102 as an array. The total number of pixels 104 in the array may depend on the size of substrate 102 and/or the spatial resolution of the generic optical matrix 100. For example, low resolution may be used for printing three-dimensional posters that can be seen at a given distance (e.g., one meter, two meters, ten meters, fifty meters, and/or other distances). High resolution may be used for labels with micro- or nano-texts, hidden images, and/or other security features. According to various implementations, the number of pixels 104 in the array may be hundreds, thousands, millions, billions, or other quantities. The array of pixels 104 may have a resolution in the range of one (or less) pixel per inch to 500,000 (or more) pixels per inch. The array of pixels 104 may be arranged as one or more of a square lattice, a hexagonal lattice, triangular lattice, rectangular lattice, a random or pseudorandom arrangement, and/or other arrangements. Individual ones of pixels 104 may be shaped as a circle, a square, a rectangle, a line, an oval, a rounded square, dots, and/or other shapes.

Different pixels 104 may correspond to different colors. That is, some of pixels 104 may reflect and/or transmit one color of light while other pixels 104 may reflect and/or transmit another color of light. The color of a given pixel may depend on an angle at which the given pixel is viewed. For example, as a viewing angle changes, a color of light reflected or transmitted by the given pixel may change (e.g., by sweeping through the range of visible colors). In some implementations, the array may include first pixels 104 corresponding to a first color and second pixels 104 corresponding to a second color. The first color may be different from the second color. The array may further include third pixels 104 corresponding to a third color. The third color may be different from the first color and the second color. In some implementations, the array may further include fourth pixels 104 corresponding to a fourth color. The fourth color may be different from the first color, the second color, and the third color. In sum, the array may include pixels corresponding to any number of different colors. According to some implementations in which the color scheme is binary, the first and second pixels 104 may respectively correspond to blue and red (or other colors). In some implementations in which the color scheme is ternary (e.g., RGB), the first, second, and third pixels 104 may respectively correspond to red, green, and blue (or other colors). In some implementations in which the color scheme is quaternion (e.g., CMYK), the first, second, third, and fourth pixels 104 may respectively correspond to cyan, magenta, yellow, and black (or other colors). Although certain color schemes are described above, it will be appreciated that other color schemes are contemplated and are within the scope of the disclosure.

In the array, pixels 104 may be arranged in a motif. Generally speaking, a motif may describe a distinctive and recurring pattern. According to some implementations, first pixels 104 and second pixels 104 may be arranged in a motif such that individual ones of first pixels 104 are positioned adjacent to individual ones of second pixels 104. In implementations having third pixels 104, they may be arranged in the motif such that individual ones of third pixels 104 are positioned adjacent to individual ones of first pixels 104 and individual ones of second pixels 104. In implementations having fourth pixels 104, they may be arranged in the motif such that individual ones of fourth pixels 104 are positioned adjacent to individual ones of first pixels 104, individual ones of second pixels 104, and individual ones of third pixels 104. In some implementations, similar pixels may not be positioned adjacent to each other (e.g., no two first pixels positioned adjacent to each other). Although pixels 104 may be arranged in a motif, as discussed above, this should not be viewed as limiting as other arrangements are contemplated and are within the scope of the disclosure. For example, pixels 104 may be arranged randomly in the array. As another example, multiple different motifs may be used such that pixels 104 in some areas of the array are arranged in a first motif and pixels 104 in other areas of the array are arranged in a second motif.

Figure 2:
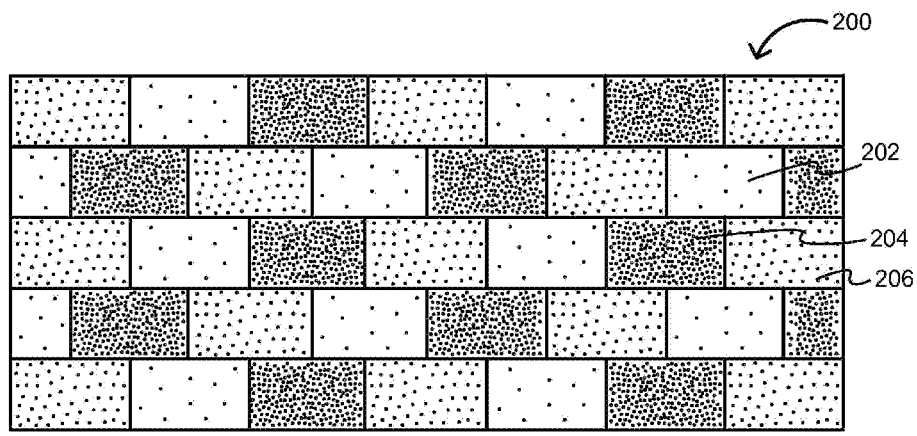
FIG. 2 illustrates an exemplary array of pixels, in accordance with one or more implementations.

FIG. 2 illustrates an exemplary array 200 of pixels, in accordance with one or more implementations. As depicted in FIG. 2, array 200 may include pixels corresponding to three different colors. Pixels similar to pixel 202 may correspond to a first color, pixels similar to pixel 204 may correspond to a second color, and pixels similar to pixel 206 may correspond to a third color. Pixels similar to pixel 202, pixels similar to pixel 204, and pixels similar to pixel 206 may be respectively arranged in superimposed hexagonal lattices such that a given pixel is adjacent to pixels of different colors and pixels of a common color are evenly distributed across array 200.

Referring again to FIG. 1, a given pixel 104 may include two or more sub-pixels 106. The sub-pixels 106 may be arranged within a given pixel 104 as one or more of a square lattice, a hexagonal lattice, triangular lattice, rectangular lattice, random or pseudorandom arrangement, and/or other arrangements. Individual ones of sub-pixels 106 may be shaped as a circle, a square, a rectangle, a line, an oval, a rounded square, dots, spirals, patterns, and/or other shapes.

Figure 3:
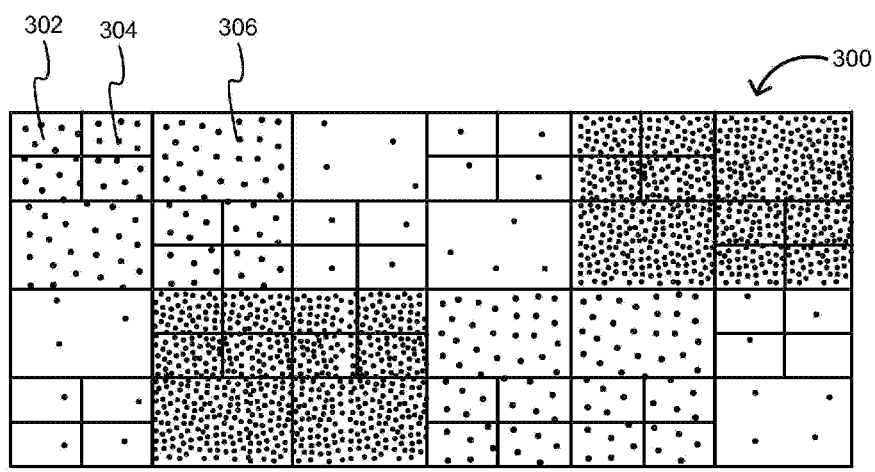
FIG. 3 illustrates an exemplary array of pixels with sub-pixels, in accordance with one or more implementations.

FIG. 3 illustrates an exemplary array 300 of pixels with sub-pixels, in accordance with one or more implementations. As depicted in FIG. 3, a given pixel may include one or more of sub-pixel 302, sub-pixel 304, sub-pixel 306, and/or other sub-pixels. The sub-pixel 302, sub-pixel 304, and/or sub-pixel 306 may be similar or different with respect to optical characteristics and/or physical characteristics. Examples of optical characteristics may include one or more of reflectivity, transmissivity, absorptivity, and/or other optical characteristics. Examples of physical characteristics may include size, shape, and/or other physical characteristics.

Turning again to FIG. 1, individual ones of sub-pixels 106 may correspond to non-color effects. The non-color effects may result from optical characteristics and/or physical characteristics of individual ones of sub-pixels 106. Such non-color effects may be achieved by optical structures included in sub-pixels 106. An optical structure of a given sub-pixel 106 may include one or more of a ruled grating, a laser grating, a photonic grating, an e-beam grating, an ion beam grating, gratings created by nanoholes, a hologram, a three-dimensional nano-structure, a kinegram, a photonic structure, a Fresnel lens, an electron-beam grid, an exelgram, an optical variable device (OVD), a diffractive optically variable image device (DOVID), a zero order device, a pixelgram (e.g., as provided by CSIRO of Australia), a holographic stereogram, a diffraction identification device (DID), a dielectric structure, a volume hologram, a liquid crystal, an interference security image structure (ISIS), a computer-generated hologram, an electron-beam grating, and/or other optical structures. In some implementations, a given optical structure may include a physical feature having a linear dimension in the range of 0.01 microns to 1000 microns. In some implementations, optical structures of sub-pixels 106 of a given pixel 104 may be configured such that some reflections/transmissions go to the right eye of a person viewing generic optical matrix 100 and other reflections/transmissions go to the left eye.

Individual optical structures of sub-pixels 106 may be configured (and/or physically structured) to reflect and/or transmit light meeting one or more conditions. For example, a given pixel 104 may include a first sub-pixel 106 and a second sub-pixel 106. The first sub-pixel 106 may include an optical structure configured to reflect and/or transmit light meeting a first condition. The second sub-pixel 106 may include an optical structure configured to reflect and/or transmit light meeting a second condition. The first condition may be different from the second condition. The light reflected and/or transmitted by the first sub-pixel 106 and the second sub-pixel 106 may be the corresponding color of the given pixel 104. The given pixel 104 may include a third sub-pixel 106 and a fourth sub-pixel 106. The third sub-pixel 106 may include an optical structure configured to reflect and/or transmit light meeting a third condition. The fourth sub-pixel 106 may include an optical structure configured to reflect and/or transmit light meeting a fourth condition. The light reflected and/or transmitted by the third sub-pixel 106 and the fourth sub-pixel 106 being the corresponding color of the given pixel 106. The third condition may be different from the first condition, the second condition, and the fourth condition. While only four conditions are described here, in some implementations, there may be any number of conditions.

The conditions associated with reflection and/or transmission may include conditions related to one or more of viewing angle, viewing distance, polarization, intensity, scattering, refractive index, birefringence, and/or other conditions. Continuing the example in the above-paragraph, the first condition and the second condition may relate to a first viewing angle. The first condition may be that the light reflected or transmitted by the optical structure of the first sub-pixel 106 is directed toward a left eye of a person observing generic optical matrix 100 from the first viewing angle. The second condition may be that the light reflected or transmitted by the optical structure of the second sub-pixel 106 is directed toward a right eye of the person observing generic optical matrix 100 from the first viewing angle. The third condition and the fourth condition may relate to a second viewing angle. The third condition may be that the light reflected or transmitted by the optical structure of the third sub-pixel 106 is directed toward the left eye of the person observing generic optical matrix 100 from the second viewing angle. The fourth condition may be that the light reflected or transmitted by the optical structure of the fourth sub-pixel 106 is directed toward a right eye of the person observing generic optical matrix 100 from the second viewing angle. The first viewing angle may be different from the second viewing angle.

Continuing the example in the above-paragraph, the first condition and the second condition may relate to a first viewing distance. The first condition may be that the light reflected or transmitted by the optical structure of the first sub-pixel 106 is directed toward the left eye of the person observing generic optical matrix 100 from the first viewing distance. The second condition may be that the light reflected or transmitted by the optical structure of the second sub-pixel 106 is directed toward the right eye of the person observing generic optical matrix 106 from the first viewing distance. The third condition and the fourth condition may relate to a second viewing distance. The third condition may be that the light reflected or transmitted by the optical structure of the third sub-pixel 106 is directed toward the left eye of the person observing 100 generic optical matrix from the second viewing distance. The fourth condition may be that the light reflected or transmitted by the optical structure of the fourth sub-pixel 106 is directed toward the right eye of the person observing generic optical matrix 100 from the second viewing distance. The first viewing distance may be different from the second viewing distance. In some implementations, images may be created from generic optical matrix that are viewable with only one eye (or view point) such as for dynamic optical effects.

Still continuing the example in the above-paragraph, the first condition and the second condition may relate to polarization. The first condition may be that the light reflected or transmitted by the optical structure of the first sub-pixel 106 has a first polarization. The second condition may be that the light reflected or transmitted by the optical structure of the second sub-pixel 106 has a second polarization. The first polarization may be different from the second polarization.

Figure 4:
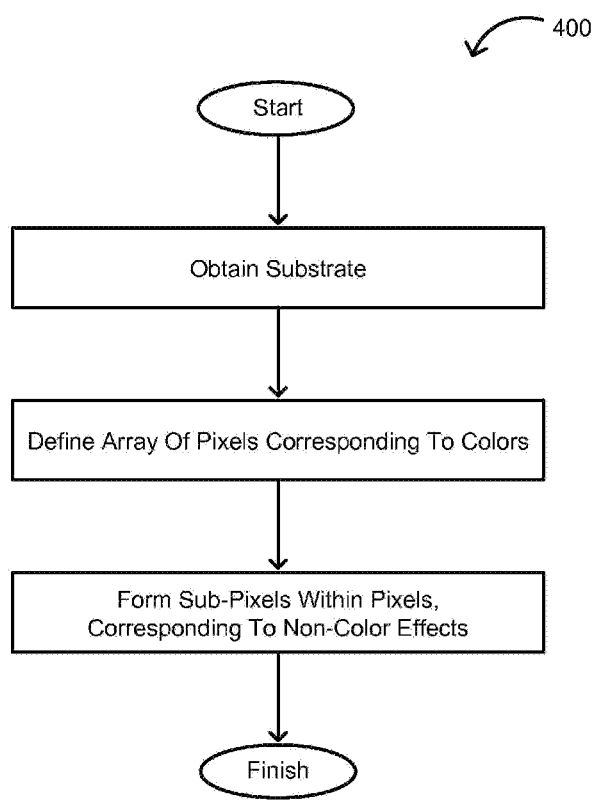
FIG. 4 illustrates a method for fabricating a generic optical matrix having pixels corresponding to color and sub-pixels corresponding to non-color effects, in accordance with one or more implementations.

FIG. 4 illustrates a method 400 for fabricating a generic optical matrix having pixels corresponding to color and sub-pixels corresponding to non-color effects, in accordance with one or more implementations. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

At a step 402, a substrate may be obtained. In accordance with one or more implementations, the substrate may be the same as or similar to substrate 102 described in connection with FIG. 1.

At a step 404, an array of pixels disposed on the substrate may be defined. The array may include first pixels corresponding to a first color and second pixels corresponding to a second color. The first color may be different from the second color. The first pixels and second pixels may be arranged in a motif such that individual ones of the first pixels are positioned adjacent to individual ones of the second pixels. In accordance with one or more implementations, the pixels may be the same as or similar to pixels 104 described in connection with FIG. 1.

At a step 406, sub-pixels may be formed within individual ones of the pixels. A given pixel may comprise a first sub-pixel and a second sub-pixel. The first sub-pixel may include an optical structure configured to reflect or transmit light meeting a first condition. The second sub-pixel may include an optical structure configured to reflect or transmit light meeting a second condition. The first condition may be different from the second condition. The light reflected or transmitted by the first sub-pixel and the second sub-pixel may be the corresponding color of the given pixel. In accordance with one or more implementations, the sub-pixels may be the same as or similar to sub-pixels 106 described in connection with FIG. 1.

Figure 5:
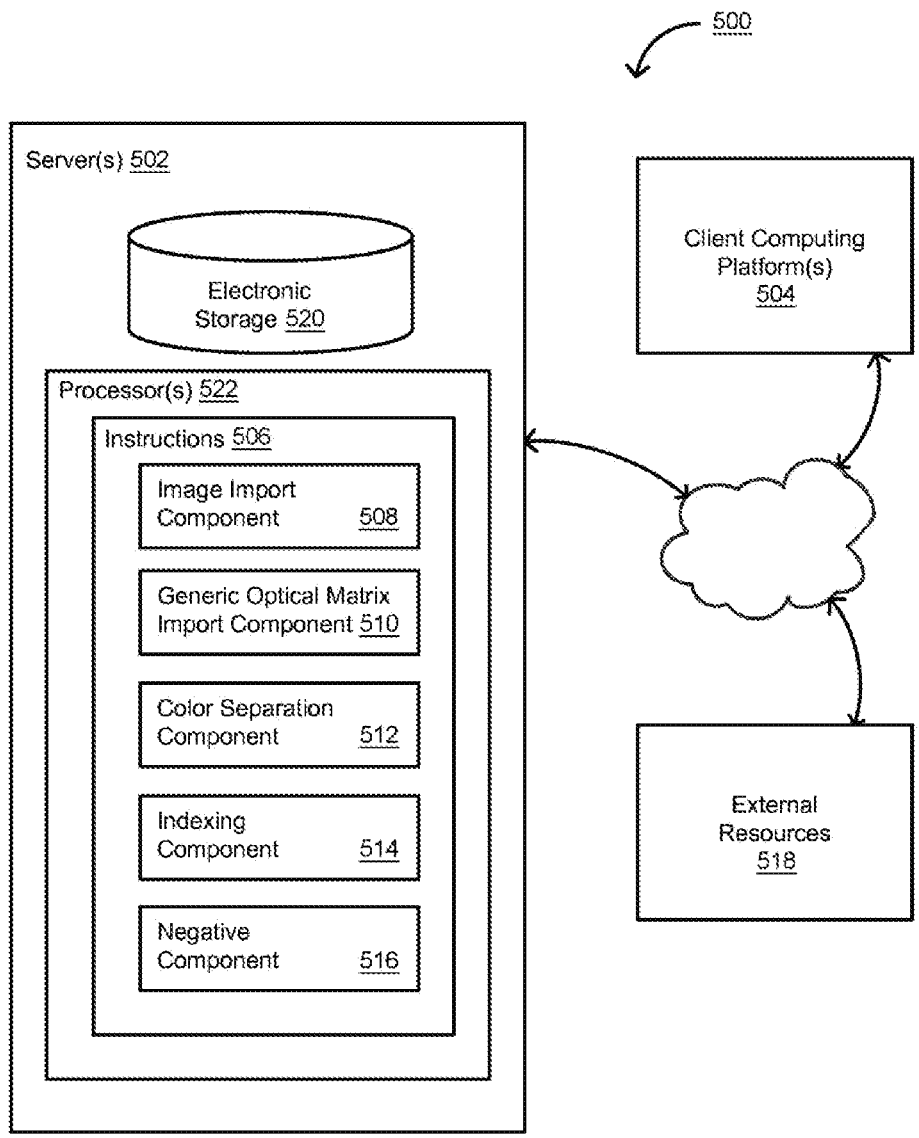
FIG. 5 illustrates a system configured for generating negatives of variable digital holographic images based on desired images and generic optical matrices, in accordance with one or more implementations.
Figure 6:
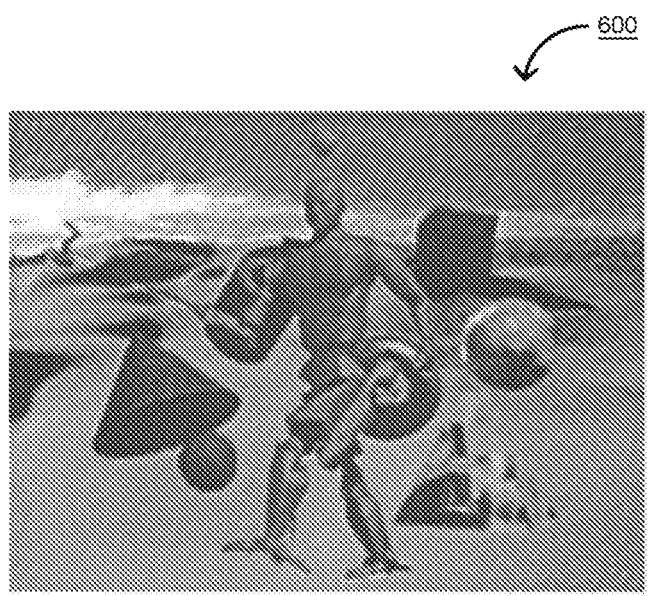
FIG. 6 illustrates an exemplary original image used for explanatory purposes throughout the present application.

FIG. 5 illustrates a system 500 configured for generating negatives of variable digital holographic images based on desired images and generic optical matrices, in accordance with one or more implementations. In some implementations, system 500 may include a server 502. The server 502 may be configured to communicate with one or more client computing platforms 504 according to a client/server architecture. The users may access system 500 via client computing platforms 504. The server(s) 502 may be configured to execute machine-readable instructions 506. The machine-readable instructions 506 may include one or more of an image import component 508, a generic optical matrix import component 510, a color separation component 512, an indexing component 514, a negative component 516, and/or other components The image import component 508 may be configured to obtain an original image. The original image may include a physical likeness or representation of a person, animal, or thing that is photographed, painted, and/or otherwise made visible. The original image may be in an electronic format. Examples of electronic formats may include one or more of JPEG, TIFF, GIF, BMP, PNG, DDS, TARGA, DWG, PRT, CMX, EPS, SVG, STL, ART, AI, PSD, PMD, QXD, DOC, 3DS, BLEND, DFF, FBX, MA, MAX, SKP, VRML, BAT, JSFL, CLS, JAVA, MPEG, RM, SWF, PAGES, PCX, PDD, SCT, DXF, DWF, SLDASM, WRL, and/or other electronic formats. The original image may be obtained from sources within system 500 and/or external resources 518. FIG. 6 illustrates an exemplary original image 600 used for explanatory purposes throughout the present application. The exemplary original image 600 depicts a figure in the foreground and several shapes in the foreground and background, all in various colors and shades. The exemplary original image 600 is in no way limiting as any image may be used as an original image, in accordance with one or more implementations.

Referring again to FIG. 5, generic optical matrix import component 510 may be configured to obtain a geometry associated with a generic optical matrix. The generic optical matrix may have pixels corresponding to color and sub-pixels corresponding to non-color effects. Exemplary implementations of generic optical matrices are described supra. The pixels may include first pixels corresponding to a first color and second pixels corresponding to a second color. The pixels may further include third pixels corresponding to a third color. The pixels may further include fourth pixels corresponding to a fourth color. The first, second, third, and fourth colors may all be different from each other. In some implementations, the pixels may correspond to red, green, and blue (RGB). In some implementations, the pixels may correspond to cyan, magenta, yellow, and black (CMYK). According to various implementations, the pixels may correspond to any number of colors.

The sub-pixels of the generic optical matrix may include first sub-pixels corresponding to a first non-color effect and second sub-pixels corresponding to a second non-color effect. The sub-pixels may further include third sub-pixels corresponding to a third non-color effect. The sub-pixels may further include fourth sub-pixels corresponding to a fourth non-color effect. According to various implementations, the sub-pixels may correspond to any number of non-color effects. Examples of non-color effects may relate to one or more of viewing angle, viewing distance, polarization, intensity, scattering, refractive index, birefringence, and/or other non-color effects. In some implementations, the first sub-pixels may corresponding to the first non-color effect may be configured to cause light reflected or transmitted by the first sub-pixels to be directed toward a left eye of a person observing the generic optical matrix from a first viewing angle. The second sub-pixels corresponding to the second non-color effect may be configured to cause light reflected or transmitted by the second sub-pixels to be directed toward a right eye of the person observing the generic optical matrix from the first viewing angle.

The geometry associated with the generic optical matrix may indicate locations and colors of pixels in the generic optical matrix. The geometry may indicate locations and non-color effects of sub-pixels within the pixels. In some implementations, the geometry may convey information associates with individual pixels and/or sub-pixels. In some implementations, the geometry may convey information associated with an aggregate of individual pixels and/or sub-pixels such as arrangement, spacing, shape, motif, pattern, and/or other information associated with an aggregate of individual pixels and/or sub-pixels.

Figure 7A:
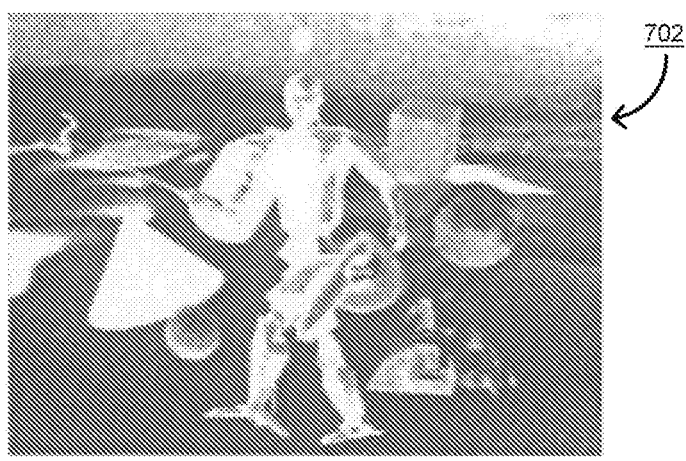
FIGS. 7A, 7B, and 7C illustrate exemplary separations corresponding to the exemplary original image of FIG. 6.
Figure 7B:
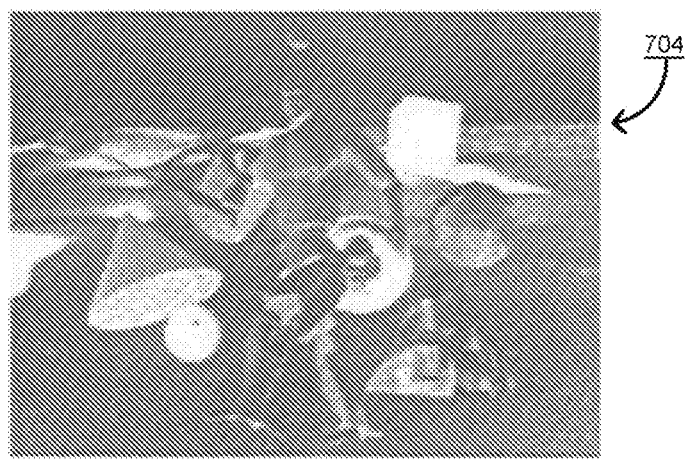
Figure 7C:
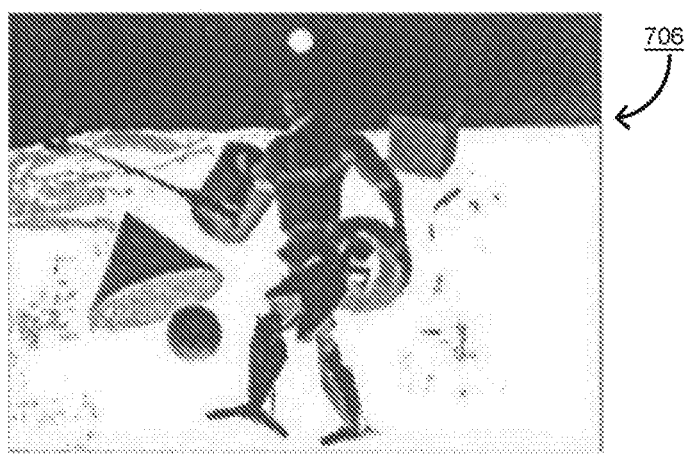

The color separation component 512 may be configured to perform color separation on the original image to provide two or more separations. Generally speaking, a separation may represent a single color component of an image. By way of non-limiting example, the separations may include a first separation and a second separation. The first separation may correspond to the first color corresponding to the first pixels of the generic optical matrix. The second separation may correspond to the second color of the second pixels of the generic optical matrix. In implementations having third pixels corresponding to a third color, the separations may include a third separation corresponding to the third color. In implementations having fourth pixels corresponding to a fourth color, the separations may include a fourth separation corresponding to the fourth color. According to various implementations, there may be any number of separations. FIGS. 7A, 7B, and 7C respectively illustrate exemplary separation 702, separation 704, and separation 706, which correspond to exemplary original image 600 of FIG. 6. The separation 702 corresponds to the red component of exemplary original image 600. The separation 704 corresponds to the green component of exemplary original image 600. The separation 706 corresponds to the blue component of exemplary original image 600. In some implementations, individual colors may have one or more separations based on the different sub-pixels. For example, a full color RGB 3D image may have two separations per color (e.g., left and right) totaling six separations. In some implementations, the number of separations may correspond to the number of desired viewing angles, viewing distances, viewpoints, and/or other viewing information.

Turning again to FIG. 5, indexing component 514 may be configured to index the separations to the geometry associated with the generic optical matrix to provide indexed separations. Continuing the example from the above-paragraph, the first separation may be indexed to the geometry with respect to the first color and the first non-color effect to provide an indexed first separation associated with the first non-color effect. The first separation may be indexed to the geometry with respect to the first color and the second non-color effect to provide an indexed first separation associated with the second non-color effect. The second separation may be indexed to the geometry with respect to the second color and the first non-color effect to provide an indexed second separation associated with the first non-color effect. The second separation may be indexed to the geometry with respect to the second color and the second non-color effect to provide an indexed second separation associated with the second non-color effect.

Figure 8:
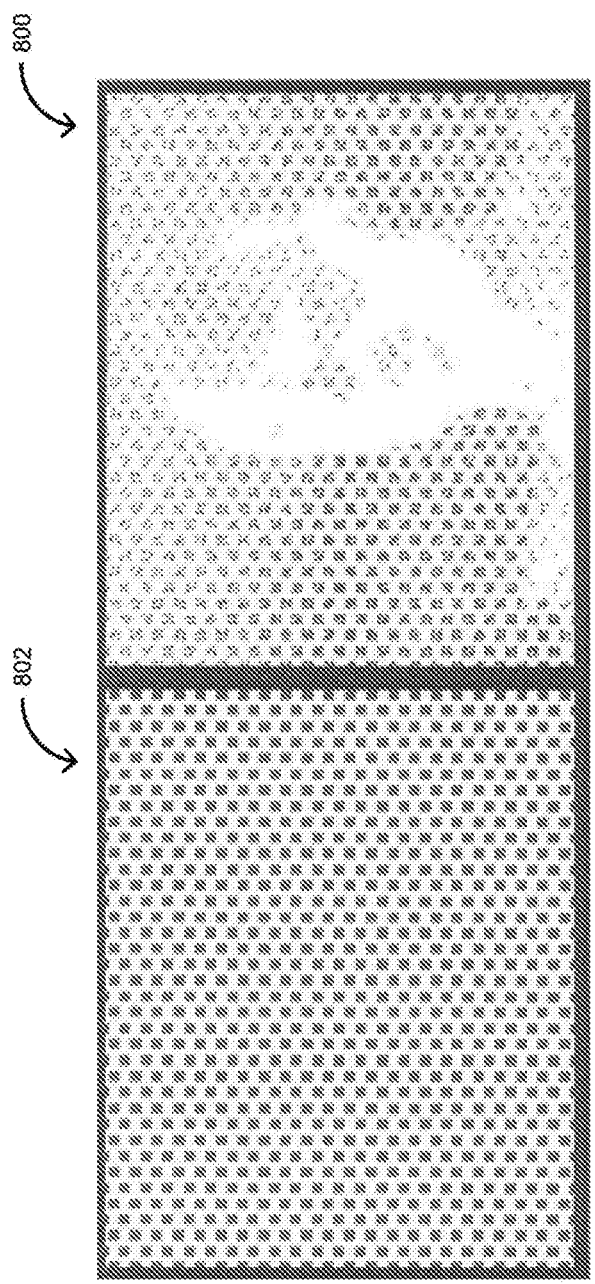
FIG. 8 illustrates an exemplary indexed separation corresponding to the exemplary original image of FIG. 6.

In some implementations, a given separation corresponding to a given color may be indexed to the geometry associated with the generic optical matrix with respect to a given non-color effect by preserving areas of the given separation that spatially correspond to pixels of the generic optical matrix corresponding to the given color and sub-pixels within the pixels corresponding to the given non-color effect. Unpreserved areas of the given separation may be obliterated. In some implementations, a given separation corresponding to a given color may be indexed to the geometry associated with the generic optical matrix with respect to a given non-color effect by obliterating areas of the given separation that spatially correspond to pixels of the generic optical matrix corresponding to the given color and sub-pixels within the pixels corresponding to the given non-color effect. Unobliterated areas of the given separation may be preserved. FIG. 8 illustrates an exemplary indexed separation 800 corresponding the exemplary original image 600 of FIG. 6. For illustrative purposes, the exemplary indexed separation 800 shows only the head region of the figure depicted in exemplary original image 600. In FIG. 8, the left panel shows pixels 802 corresponding to the color red in a generic optical matrix. In the right panel of FIG. 8, exemplary indexed separation 800 is created by determining which areas of separation 702 (see FIG. 7) spatially correspond to pixels of the generic optical matrix show in the left panel of FIG. 8. Where there is spatial correspondence, separation 702 is preserved. Where there is no spatial correspondence, separation 702 is obliterated.

Figure 9:
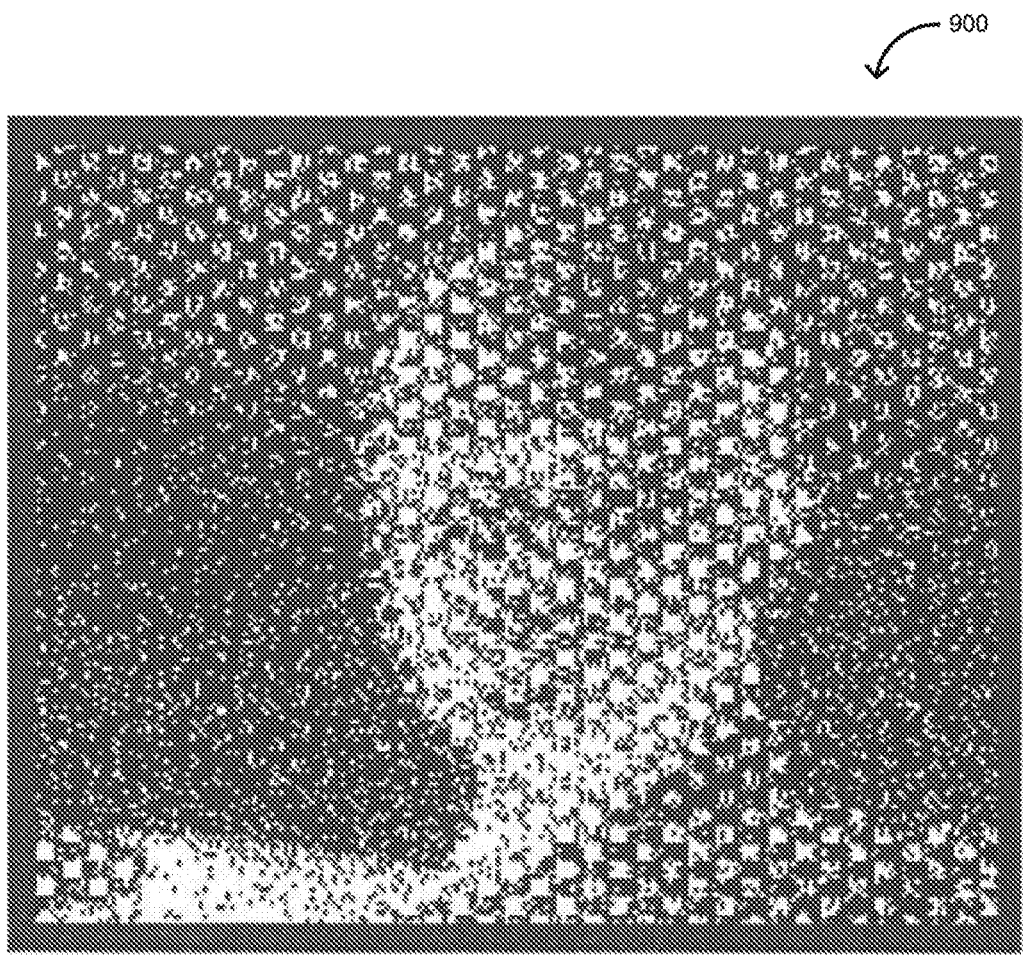
FIG. 9 illustrates an exemplary negative corresponding to the exemplary original image of FIG. 6.

Looking again at FIG. 5, negative component 516 may be configured to merge the indexed separations to provide a negative of the original image. Continuing the example made above in connection with indexing component 514, the indexed first separation associated with the first non-color effect, the indexed first separation associated with the second non-color effect, the indexed second separation associated with the first non-color effect, and the indexed second separation associated with the second non-color effect may be merged by combining the preserved areas while maintaining the spatial position of the preserved areas. In some implementations, the indexed first separation associated with the first non-color effect, the indexed first separation associated with the second non-color effect, the indexed second separation associated with the first non-color effect, and the indexed second separation associated with the second non-color effect may be merged by combining the obliterated areas while maintaining the spatial position of the obliterated areas. FIG. 9 illustrates an exemplary negative 900 corresponding to the exemplary original image of FIG. 6. For illustrative purposes, the exemplary negative 900 shows only the head region of the figure depicted in exemplary original image 600. The exemplary negative 900 was created by merging indexed separation 800 (see FIG. 8) with indexed separations corresponding to other colors and/or non-color effects such that the preserved areas were combined while maintain the relative spatial position of the preserved areas.

Returning to FIG. 5, server(s) 502, client computing platform(s) 504, and/or external resources 518 may be operatively linked via one or more electronic communication links, in some implementations. For example, such electronic communication links may be established, at least in part, via a network such as the Internet and/or other networks. It will be appreciated that this is not intended to be limiting, and that the scope of this disclosure includes implementations in which server(s) 502, client computing platform(s) 504, and/or external resources 518 may be operatively linked via some other communication media.

A given client computing platform 504 may include one or more processors configured to execute machine-readable instructions. The machine-readable instructions may be configured to enable an expert or user associated with the given client computing platform 504 to interface with system 500 and/or external resources 518, and/or provide other functionality attributed herein to client computing platform(s) 504. By way of non-limiting example, the given client computing platform 504 may include one or more of a desktop computer, a laptop computer, a handheld computer, a tablet computing platform, a NetBook, a Smartphone, and/or other computing platforms.

External resources 518 may include sources of information, hosts and/or providers of information outside of system 500, external entities participating with system 500, and/or other resources. In some implementations, some or all of the functionality attributed herein to external resources 518 may be provided by resources included in system 500.

Server(s) 502 may include electronic storage 520, one or more processors 522, and/or other components. Server(s) 502 may include communication lines, or ports to enable the exchange of information with a network and/or other computing platforms. Illustration of server(s) 502 in FIG. 5 is not intended to be limiting. Server(s) 502 may include a plurality of hardware, software, and/or firmware components operating together to provide the functionality attributed herein to server(s) 502. For example, server(s) 502 may be implemented by a cloud of computing platforms operating together as server(s) 502.

Electronic storage 520 may comprise non-transitory storage media that electronically stores information. The electronic storage media of electronic storage 520 may include one or both of system storage that is provided integrally (i.e., substantially non-removable) with server(s) 502 and/or removable storage that is removably connectable to server(s) 502 via, for example, a port (e.g., a USB port, a firewire port, etc.) or a drive (e.g., a disk drive, etc.). Electronic storage 520 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 520 may include one or more virtual storage resources (e.g., cloud storage, a virtual private network, and/or other virtual storage resources). Electronic storage 520 may store software algorithms, information determined by processor(s) 522, information received from server(s) 502, information received from client computing platform(s) 504, and/or other information that enables server(s) 502 to function as described herein.

Processor(s) 522 may be configured to provide information processing capabilities in server(s) 502. As such, processor(s) 522 may include one or more of a digital processor, an analog processor, a digital circuit designed to process information, an analog circuit designed to process information, a state machine, and/or other mechanisms for electronically processing information. Although processor(s) 522 is shown in FIG. 5 as a single entity, this is for illustrative purposes only. In some implementations, processor(s) 522 may include a plurality of processing units. These processing units may be physically located within the same device, or processor(s) 522 may represent processing functionality of a plurality of devices operating in coordination. The processor(s) 522 may be configured to execute machine-readable instruction components 508, 510, 512, 514, 516, and/or other components. Processor(s) 522 may be configured to execute machine-readable instruction components 508, 510, 512, 514, 516, and/or other components by software; hardware; firmware; some combination of software, hardware, and/or firmware; and/or other mechanisms for configuring processing capabilities on processor(s) 522. As used herein, the term "machine-readable instruction component" may refer to any component or set of components that perform the functionality attributed to the machine-readable instruction component. This may include one or more physical processors during execution of machine-readable instructions, the machine-readable instructions, circuitry, hardware, storage media, and/or any other components.

It should be appreciated that although machine-readable instruction components 508, 510, 512, 514, and 516 are illustrated in FIG. 5 as being implemented within a single processing unit, in implementations in which processor(s) 522 includes multiple processing units, one or more of machine-readable instruction components 508, 510, 512, 514, and/or 516 may be implemented remotely from the other machine-readable instruction components. The description of the functionality provided by the different machine-readable instruction components 508, 510, 512, 514, and/or 516 described herein is for illustrative purposes, and is not intended to be limiting, as any of machine-readable instruction components 508, 510, 512, 514, and/or 516 may provide more or less functionality than is described. For example, one or more of machine-readable instruction components 508, 510, 512, 514, and/or 516 may be eliminated, and some or all of its functionality may be provided by other ones of machine-readable instruction components 508, 510, 512, 514, and/or 516. As another example, processor(s) 522 may be configured to execute one or more additional machine-readable instruction components that may perform some or all of the functionality attributed herein to one of machine-readable instruction components 508, 510, 512, 514, and/or 516.

Figure 10:
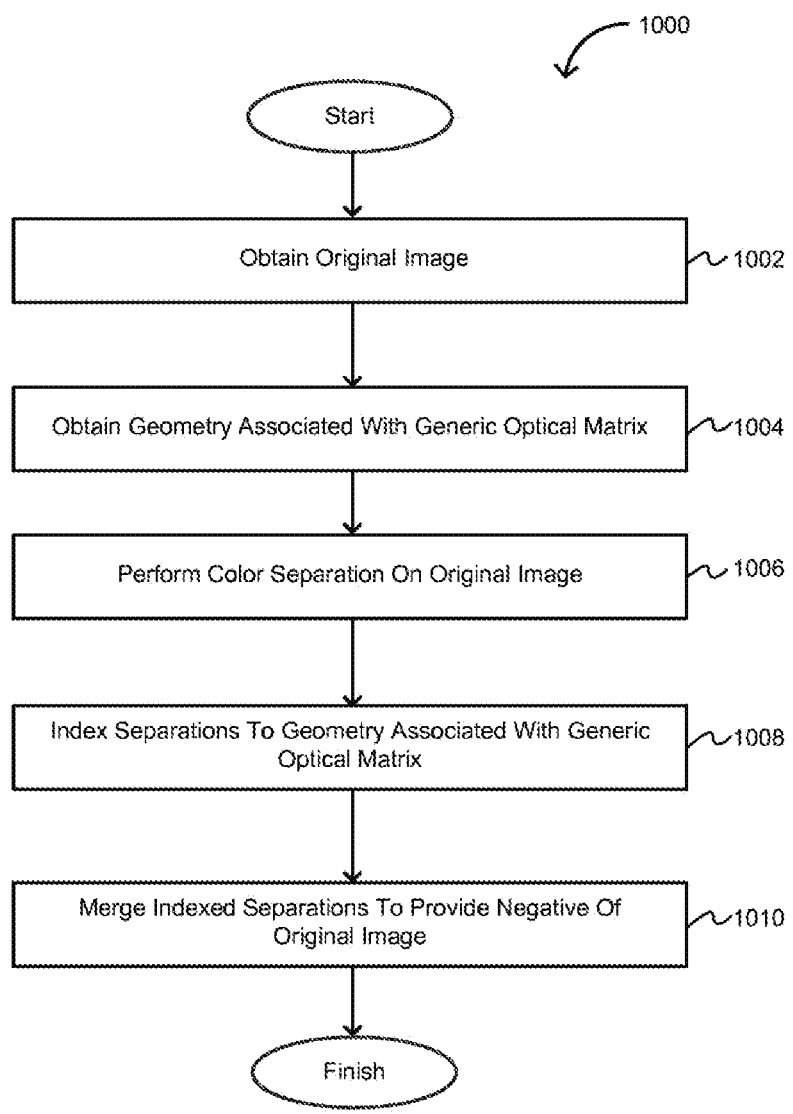
FIG. 10 illustrates a method for generating negatives of variable digital holographic images based on desired images and generic optical matrices, in accordance with one or more implementations.

FIG. 10 illustrates a method 1000 for generating negatives of variable digital holographic images based on desired images and generic optical matrices, in accordance with one or more implementations. The operations of method 1000 presented below are intended to be illustrative. In some implementations, method 1000 may be accomplished with one or more additional operations not described, and/or without one or more of the operations discussed. Additionally, the order in which the operations of method 1000 are illustrated in FIG. 10 and described below is not intended to be limiting.

In some implementations, method 1000 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1000 in response to instructions stored electronically on an electronic storage medium. The one or more processing devices may include one or more devices configured through hardware, firmware, and/or software to be specifically designed for execution of one or more of the operations of method 1000.

At an operation 1002, an original image may be obtained. Operation 1002 may be performed by one or more processors configured to execute an image import component that is the same as or similar to image import component 508, in accordance with one or more implementations.

At an operation 1004, a geometry associated with a generic optical matrix may be obtained. The generic optical matrix may have pixels corresponding to color and sub-pixels corresponding to non-color effects. The pixels may include first pixels corresponding to a first color and second pixels corresponding to a second color. The sub-pixels may include first sub-pixels corresponding to a first non-color effect and second sub-pixels corresponding to a second non-color effect. The geometry may indicate locations and colors of pixels in the generic optical matrix. The geometry may indicate locations and non-color effects of sub-pixels within the pixels. Operation 1004 may be performed by one or more processors configured to execute a generic optical matrix import component that is the same as or similar to generic optical matrix import component 510, in accordance with one or more implementations.

At an operation 1006, color separation may be performed on the original image to provide two or more separations including a first separation and a second separation. The first separation may correspond to the first color and the second separation corresponding to the second color. Operation 1006 may be performed by one or more processors configured to execute a color separation component that is the same as or similar to color separation component 512, in accordance with one or more implementations.

At an operation 1008, the separations may be indexed to the geometry associated with the generic optical matrix to provide indexed separations. The first separation may be indexed to the geometry with respect to the first color and the first non-color effect to provide an indexed first separation associated with the first non-color effect. The first separation may be indexed to the geometry with respect to the first color and the second non-color effect to provide an indexed first separation associated with the second non-color effect. The second separation may be indexed to the geometry with respect to the second color and the first non-color effect to provide an indexed second separation associated with the first non-color effect. The second separation may be indexed to the geometry with respect to the second color and the second non-color effect to provide an indexed second separation associated with the second non-color effect. Operation 1008 may be performed by one or more processors configured to execute an indexing component that is the same as or similar to indexing component 514, in accordance with one or more implementations.

At an operation 1010, the indexed separations may be merged to provide a negative of the original image. Operation 1010 may be performed by one or more processors configured to execute a negative component that is the same as or similar to negative component 516, in accordance with one or more implementations.

Figure 11:
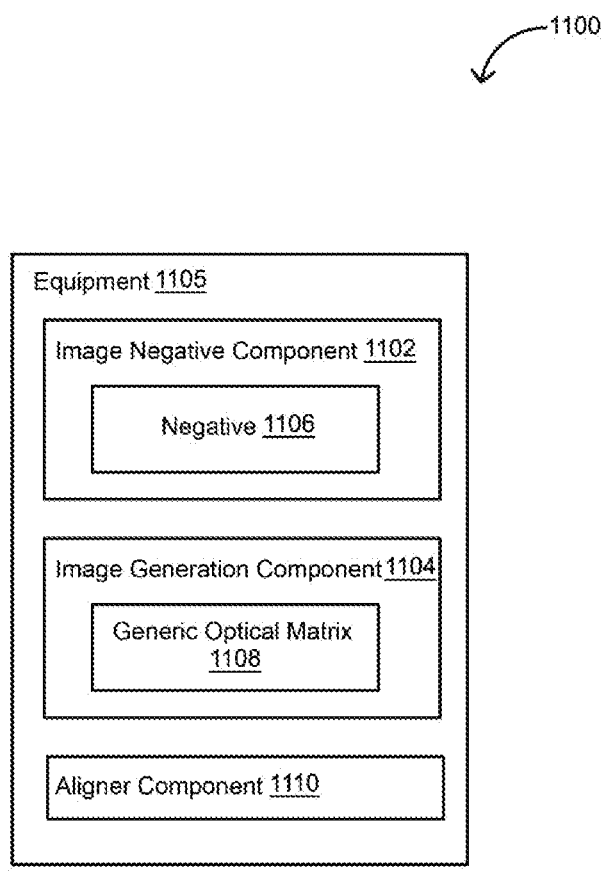
FIG. 11 illustrates a system configured for fabricating variable digital optical images using generic optical matrices, in accordance with one or more implementations.

FIG. 11 illustrates a system 1100 configured for fabricating variable digital optical images using generic optical matrices, in accordance with one or more implementations. In exemplary implementations, system 1100 may include one or more of an image negative component 1102, an image generation component 1104, and/or other components. One or more components of system 1100 may be included in equipment 1105. Equipment 1105 may include one or more of traditional printing equipment, roll-to-roll printing equipment, embossing equipment, digital printing equipment, desktop printing equipment, display screens (e.g. 3D displays), printing devices, printing accessories, printing supplies, flexographic equipment, offset equipment, rotogravure equipment, demetallizing equipment, silkscreen equipment, ink jet equipment, silver halide photographic equipment, and/or other equipment.

The image negative component 1102 may be configured to retain a negative 1106 corresponding to a base image. The base image may include a physical likeness or representation of a person, animal, and/or thing that is photographed, painted, and/or otherwise made visible. According to various implementations, negative 1106 may be embodied on a physical substrate or negative 1106 may be in an electronic format, as discussed further herein. As such, image negative component 1102 may include a physical apparatus configured to physically retain a physical substrate embodying negative 1106. The image negative component 1102 may include electronic storage configured to store negative 1106 in an electronic format. The image negative component 1102 may include one or more processors configured to provide information associated with negative 1106 to one or more other components of system 1100.

Figure 12:
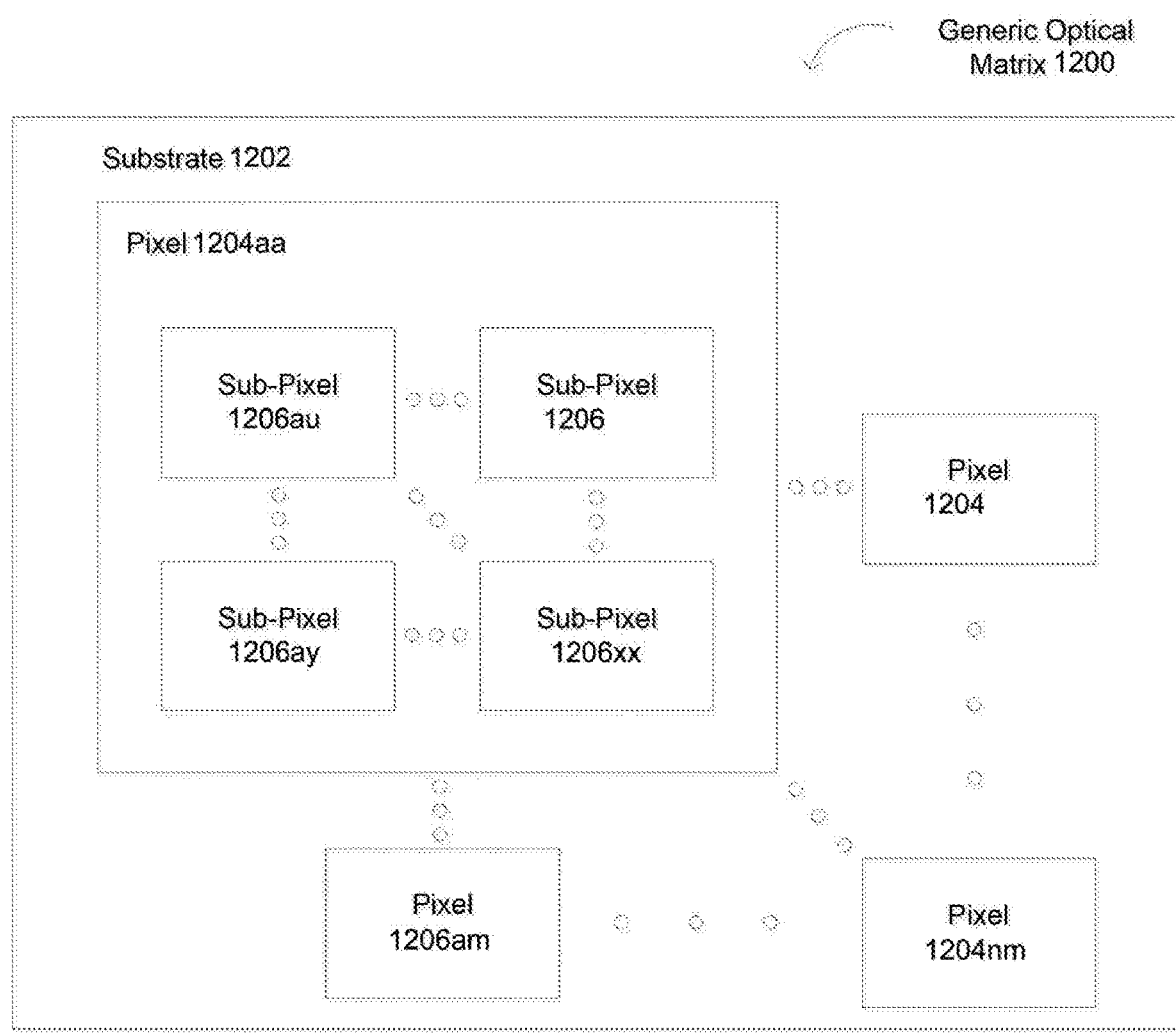
FIG. 12 illustrates a generic optical matrix having pixels corresponding to color and sub-pixels corresponding to non-color effects, in accordance with one or more implementations.

The negative 1106 may be based on the base image and a geometry associated with a generic optical matrix. Exemplary implementations for generating a negative are described supra. The generic optical matrix may have pixels corresponding to color and sub-pixels corresponding to non-color effects. For example, the pixels may include first pixels corresponding to a first color and second pixels corresponding to a second color. The sub-pixels may include first sub-pixels corresponding to a first non-color effect and second sub-pixels corresponding to a second non-color effect. The geometry may indicate locations and colors of pixels in the generic optical matrix. The geometry may indicate locations and non-color effects of sub-pixels within the pixels. FIG. 12 illustrates a generic optical matrix 1200, in accordance with one or more implementations. As depicted, the generic optical matrix 1200 may include a substrate 1202 with pixels 1204 corresponding to color and sub-pixels 1206 corresponding to non-color effects. Exemplary implementations, generic optical matrices are described supra.

Referring again to FIG. 11, image generation component 1104 may be configured to obliterate individual ones of the pixels and/or sub-pixels of a generic optical matrix 1108 according to negative 1106 while preserving remaining pixels and/or sub-pixels. The remaining pixels and/or sub-pixels may form an optical image corresponding to the base image. The optical image may be colored based on the remaining pixels. The optical image may exhibit non-color effects corresponding to the remaining sub-pixels. The non-color effects of the remaining sub-pixels may give rise to one or more optical effects observable when viewing the optical image. The one or more optical effects may include one or more of a three-dimensional optical effect, a two-dimensional optical effect, a dynamic optical effect, a scattering effect, a holographic white effect, a lens effect, a Fresnel lens effect, a brightness modulation effect, a lithographic effect, a stereogram effect, a nanotext and/or microtext effect, a hidden image effect, a moire effect, a concealed animated pattern effect, a covert laser readable (CLR) effect, a multiple background effect, a pearlescent effect, a true color image effect, a guilloche effect, an animation effect, an achromatic Fresnel effect, a dynamic CLR image, a kinematic images, a full parallax effect, a scratch holographic effect, a polarizing effect, a watermark effect, a metallic effect, a binary optical structure, a Fresnel prism, and/or other optical effects.

Individual ones of the remaining sub-pixels may reflect light at a specific viewing angle with a color corresponding to that of the individual pixels associated with the remaining sub-pixels. According to some implementations, the optical image may comprise one or more of a hologram, a stereo image, an optically variable device (OVD) based image, a diffractive optically variable image, a zero order device (ZOD) based image, a blazed diffraction structure based image, a first order device (FOZ) based image, a dot matrix image, a pixelgram image, a structural color structure based image, a diffractive identification device (DID) based image, an interference security image structure (ISIS) based image, a kinegram image, an excelgram image, a diffractive optical element based image, a photonic structure based image, a nanohole based image, computer generated holograms, electron-beam generated optical structures, interference patterns, and/or other optical images.

According to some implementations, a person may view the optical image from a specific viewpoint or viewing window (e.g., a range of viewing angles and/or distances). By changing the viewpoint or viewing window (e.g., by moving the optical image relative to the person's eyes), observed colors of the optical image may change due to the reflective properties of the optical structures included in the optical image. The viewpoint or viewing window may be limited in implementations where only the optical structures provide color in the optical image. In order to avoid such a limitation, the optical image may be overprinted with specific colors at corresponding pixels and/or sub-pixels. For example, if the optical image includes two sub-pixels to be viewed as red—one for the right eye and one for the left eye, the viewpoint or viewing window may be relatively small. However, by overprinting those two sub-pixels with a translucent red colored ink, the viewpoint or viewing window may increase because this colored ink maintains the red color with no shift through the rainbow and optical structures of the two sub-pixels keep reflecting light to desired directions. In some implementations, high refractive index lacquers may be used for the purpose of being able to overprint on top with translucent inks and/or lacquers without obliterating pixels and/or sub-pixels. Thus, some implementations may provide optical images having pixels and/or sub-pixels that reflect their particular color but shift throughout the rainbow at different angles, or have a colored filter that helps them extend the viewpoint or viewing window.

In some implementations, translucent or transparent material may be used to overprint pixels that are not obliterated. The translucent or transparent material may be configured to act as a color filter. The color filter may be configured to increase an angle of observation of the optical image. The translucent or transparent material may include one or more of a lacquer, a UV ink, and/or other materials. The translucent or transparent material may have a high refractive index. In some implementations, the high refractive index may be greater than that of a material making up the optical structures of sub-pixels of the generic optical matrix. The index of refraction of a material making up the optical structures of sub-pixels of the generic optical matrix may be between approximately 1.4 and approximately 1.6. In some implementations, the high refractive index may be between approximately 1.75 and approximately 2. The high refractive index may be greater than 2. One reason for the difference in index of refraction between the generic optical matrix and the material used for overprinting is that when optical structures are covered by a material with the same index of refraction, the optical structure may become obliterated. In some implementations, overprinting pixels and/or sub-pixels may be performed with RGB or YMCK printing systems using inks in order to generate full color images where pixels and/or sub-pixels below the translucent or transparent inks continue to provide corresponding non-color effects.

The negative 1106 being embodied on a physical substrate may facilitate a number of techniques for producing optical images. In some implementations, the physical substrate embodying negative 1106 may include a transparent film with negative 1106 printed thereon, a UV lacquer laminate, a polycarbonate laminate, an acrylic laminate, a silicon laminate, a glass laminate, a projection negative, a demetallized substrate, a chemical etched substrate, a laser ablated substrate, an ion etched substrate, a UV high refractive index substrate, and/or other substrates.

Figure 13:
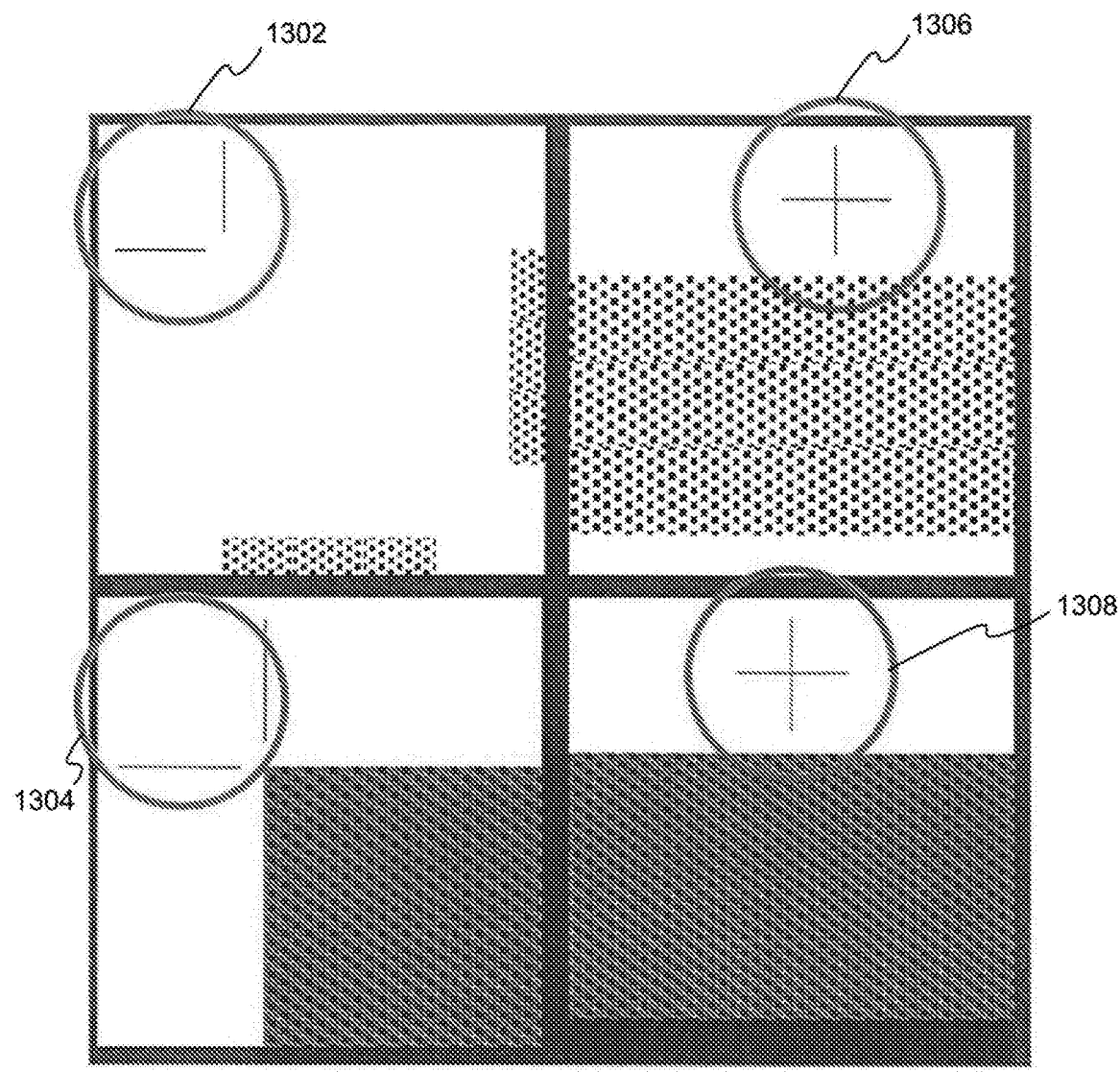
FIG. 13 illustrates exemplary registration marks of a negative and a generic optical matrix, in accordance with one or more implementations.

The system 1100 may include an aligner component 1110 configured to align one or more registration marks on negative 1106 with one or more corresponding registration marks on generic optical matrix 1108. FIG. 13 illustrates exemplary registration marks of a negative and a generic optical matrix, in accordance with one or more implementations. The aligner component 1110 may be configured to align registrations marks 1302 of a negative with registration marks 1304 of a generic optical matrix. The aligner component 1110 may be configured to align registrations marks 1306 of a negative with registration marks 1308 of a generic optical matrix. In some implementations, registration mark may include one or more of marks adjacent to a generic optical matrix on the same substrate, marks within a generic optical matrix, marks made by and/or observable via optical means, and/or other marks. Examples of registration marks may include one or more of thin lines, thin achromatic lines, RGB lines, scattering lines, holographic white lines, diffractive and/or holographic thin lines, printed colored lines, and/or other marks. In some implementations, a registration mark may be included in the generic optical matrix and a corresponding registration mark may be included in a corresponding negative.

Turning back to FIG. 11, in some implementations, a radiation curable material may be disposed between negative 1106 and generic optical matrix 1108. The radiation curable material may have an index of refraction, when cured, that is the same as or similar to an index of refraction of generic optical matrix 1108. The radiation curable material may include one or more materials (e.g., liquid, gel, film, and/or other materials) that become cured when exposed to radiation. Examples of such radiation may include one or more of ultraviolet radiation, laser radiation, electron beam radiation, sunlight radiation, UV LED radiation, and/or other radiation. In some implementation, the radiation curable material may include a lacquer that is cured when exposed to ultraviolet light. The radiation curable material may be transparent when cured. The radiation curable material may be colored when cured.

When the radiation curable material has been cured, it may become affixed, adhered, bonded, and/or otherwise attached to generic optical matrix 1108. As such, image generation component 1104 may be configured to obliterate individual ones of the pixels and/or sub-pixels of generic optical matrix 1108 by exposing the physical substrate embodying negative 1106 to radiation such that the radiation passes through portions of the physical substrate where negative 1106 is not located and exposes corresponding portions of the radiation curable material. The portions of the radiation curable material may become cured responsive to being exposed to the radiation. The cured radiation curable material may obliterate collocated pixels and/or sub-pixels. For example, a given sub-pixel may comprise an optical structure configured to give rise to an optical effect associated with the given sub-pixel. Because the radiation curable material may have an index of refraction that is the same as or similar to that of the optical structure, when the optical structure is buried by cured radiation curable material, the optical structure may lose its ability to provide the optical effect. In some implementations, obliterated pixels and/or sub-pixels may be rendered transparent. The obliterated pixels and/or sub-pixels rendered transparent may allow a substrate of generic optical matrix 1108 to be visible at the obliterated pixels and/or sub-pixels rendered transparent. The substrate of the generic optical matrix may be white (or any other color) such that the obliterated pixels and/or sub-pixels rendered transparent appear white (or any other color). In some implementations, a pixel and/or sub-pixel may be obliterated by one or more of chemical etching, laser ablation, and/or other techniques.

In some implementations, image generation component 1104 may be configured to print ink and/or otherwise deposit pigment on generic optical matrix 1108. The image generation component 1104 may be configured to print black ink and/or other pigments over individual pixels and/or sub-pixels (e.g., preserved and/or obliterated pixels and/or sub-pixels). The image generation component 1104 may be configured to print black at various densities over individual ones of the remaining pixels and/or sub-pixels to affect a brightness of the individual ones of the remaining pixels and/or sub-pixels. The density of the black may refer to one or more of a stipple density of the black, a grey scale, and/or other ways in which the density of the black may be expressed.

The optical image generated by image generation component 1104 may be permanent and/or durable such that it is useful for a variety of applications. For example, due to the fact that a generic optical matrix may be made with multiple left/right views, some implementations may be applicable to three-dimensional displays. Examples of three-dimensional displays may include one or more of 3D computer screens, 3D television, screens for 3D games, telephone screens, head mounted displays, medical monitors, LED displays, ELD displays, LCD displays, OLED displays, SED displays, laser TV displays, carbon nanotubes displays, quantum dot displays, light field displays, game displays, and/or other three-dimensional displays. Some implementations may include an ability to illuminate a generic optical matrix. In some such implementations, a background panel formed by LEDs (or other light source) may be registered with a generic optical matrix. One the side of the generic optical matrix opposite the background panel, there may be color filters also in register with the generic optical matrix. The display may receive transmission signals similar to the transmission signals for TV broadcasting. The transmission signals may depend on individual optical structures of sub-pixels that illuminate a continuous image that will be visible because one image may go to the left eye and the other to the right eye, thus creating continuous three-dimensional images.

Some implementations may facilitate printing instant optical structures. For example, once an optical image has been generated, it may be one or more of electroformed on a nickel plate and/or on a continuous roller, molded on a transparent film, made on top of the covering of a continuous roller, disposed on a nickel sleeve, disposed on a transparent sleeve, disposed on a cast resin roller, and/or otherwise facilitate printing instant optical structures.

Some implementations may facilitate traditional embossing. For example, on an optical image has been created by image generation component 1104, it may be converted into a traditional embossing apparatus. Examples of a traditional embossing apparatus may include one or more of a nickel shim, a nickel roller, a plastic shim, a plastic roller, a molded roller, a cast and cure film, a cold-stamping or hot-stamping application, a cast roll-to-roll UV curing equipment with traditional ink printing, and/or other traditional embossing apparatus. The traditional embossing apparatus may be used to engrave based on the optical image using a traditional embossing matching and/or UV/eB molding equipment for various applications, such as one or more of labels, packaging, security documents, posters, optical films, self-cleaning surfaces, structural color applications (e.g., Morpho butterfly colors), biomimetic structures, and/or other applications. Compared to conventional approaches, exemplary implementations may provide a master that can be ready to emboss in only a few minutes instead of waiting days or several weeks. Thus, exemplary implementation may give traditional embossing plants the advantage of being able to fabricate products very quickly for their clients without delays.

Some implementations may be used with traditional printing equipment. For example, on an optical image has been created by image generation component 1104, it may be used as an embossing and/or molding accessory of a printing machine for engraving and/or marking the image in register in an ink printout. Contrary to conventional approaches, exemplary implementations may facilitate a printing company not having an optical laboratory at least because it does not need to have electroforming installations, it does not need embossing equipment, and it does not need laser systems.

Figure 14:
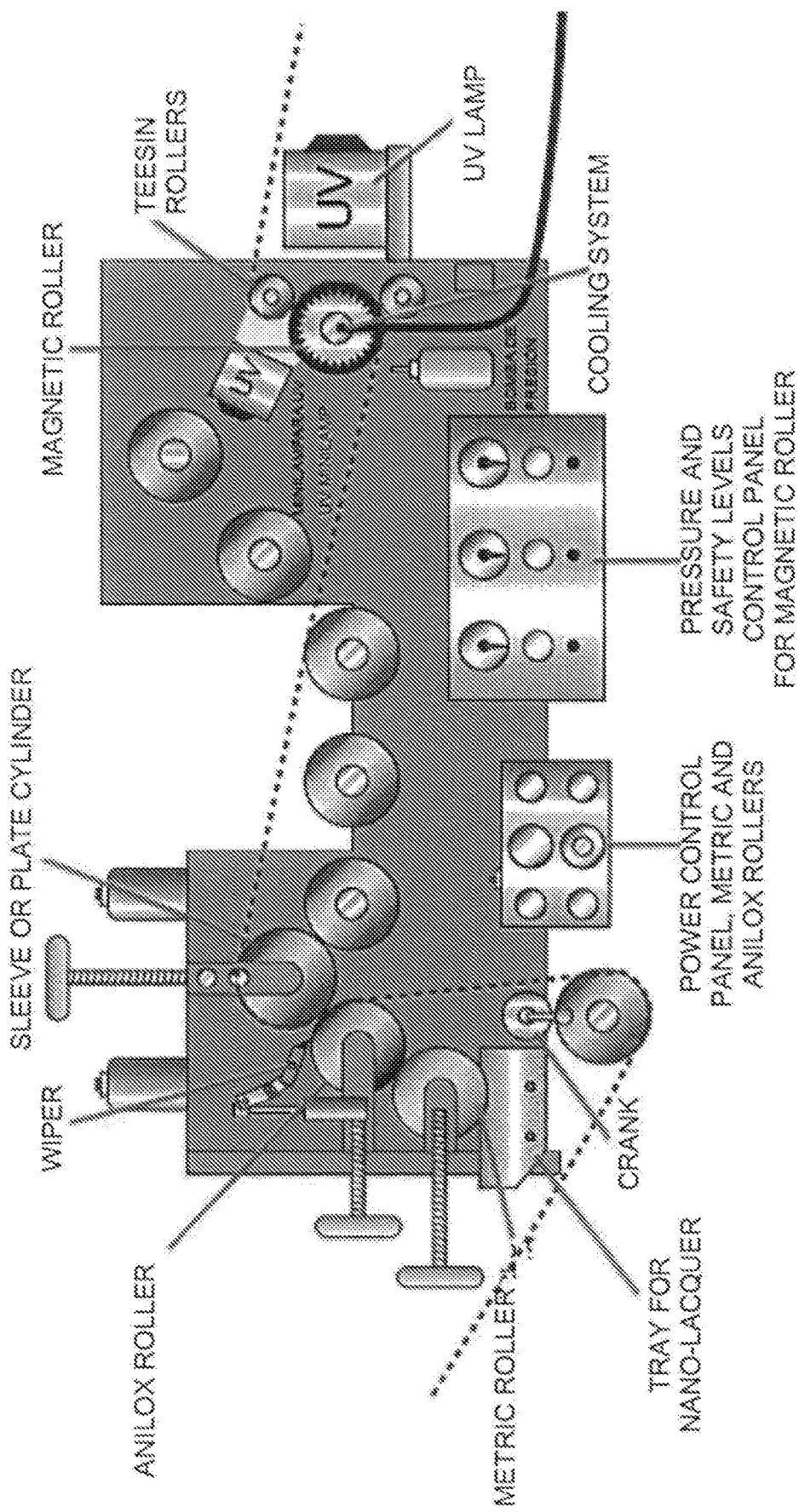
FIG. 14 illustrates an exemplary roll-to-roll printing configuration, in accordance with one or more implementation.

Some implementations may be used with roll-to-roll printing equipment (see, e.g., FIG. 14). For example, in a printing station of a traditional printer, a radiation curable material (e.g., a thixotropic lacquer, a curable UV lacquer or coating, and/or other material) for engraving may be applied before an engraving and/or molding accessory. The engraving and/or molding accessory may have an optical image created by image generation component 1104 already fixed. When the radiation curable material reaches an engraving and/or molding station, the optical image may be transferred to it, whether by pressure, UV molding, and/or other techniques. In the case of UV molding, system 1100 may take into account that a substrate to be printed on may be a transparent substrate such as a film or an opaque substrate such as a paper. For the purpose of being able to mold both types of substrate, namely those comprising transparent or opaque materials, the latter may be a nickel shim.

Figure 15:
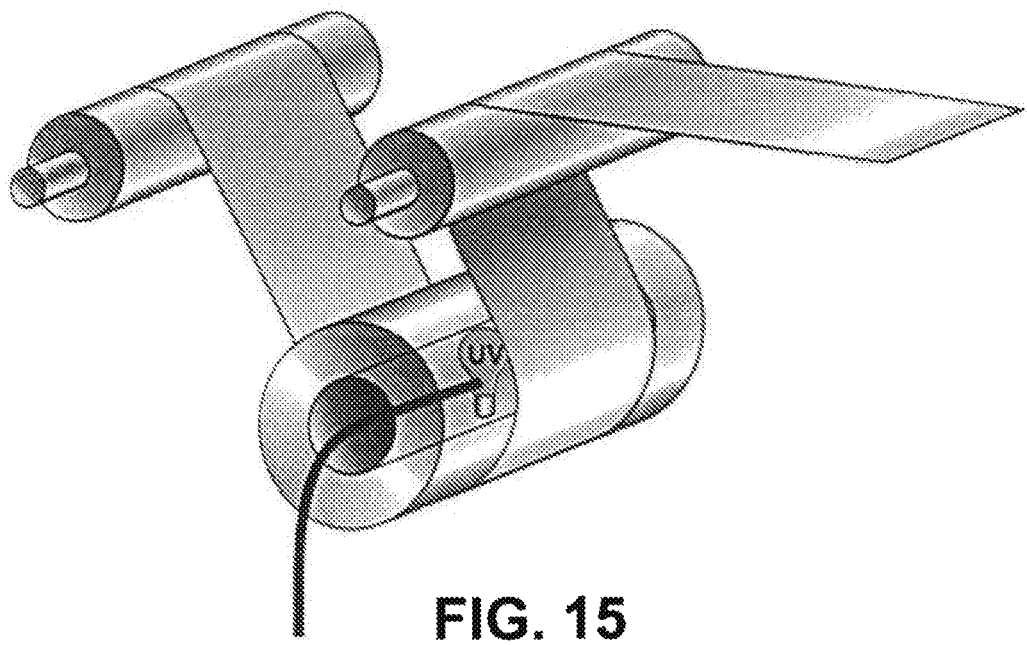
FIG. 15 illustrates an exemplary cylinder with internal lighting, which may be used in a roll-to-roll printing apparatus, in accordance with one or more implementations.

According to some implementation, a cylinder or roller in a roll-to-roll printing apparatus may be illuminated by UV light from its interior for the purpose of molding the optical image on a substrate that travels over its surface (see, e.g., FIG. 15). An effect of the UV illumination may be based on the physical laws of total internal reflection, similar to fiber optics that conducting light in their interior. The UV light may invade the cylinders, either from one or both sides. If the cylinder is transparent, the UV light may be transmitted by the phenomenon of total internal reflection. In some implementations, a cylinder and a holographic shim may be transparent (instead of a nickel shim) with a UV plastic copy of the optical image wrapped around the transparent cylinder.

Figure 16:
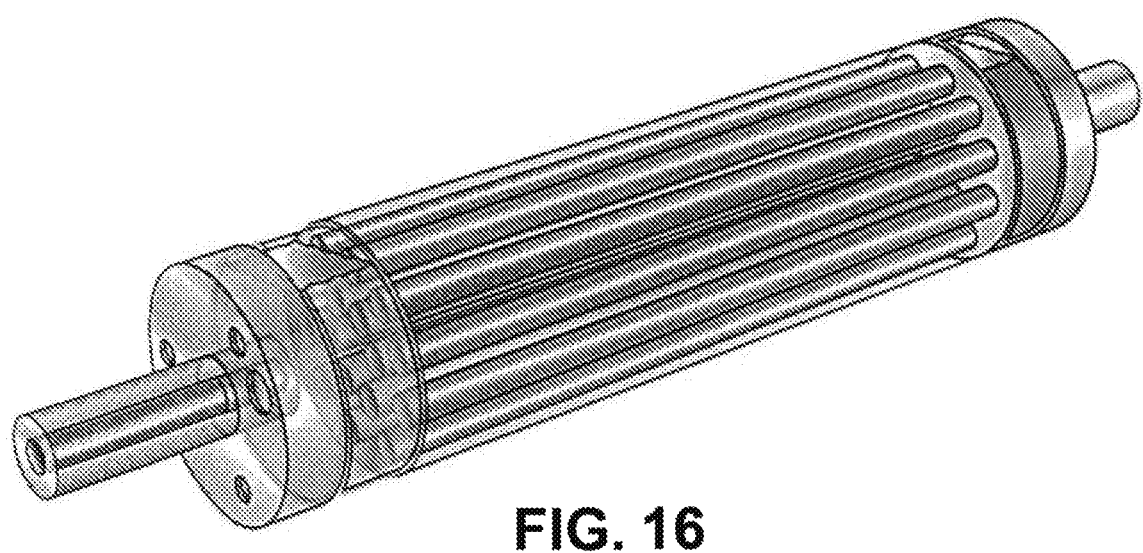
FIG. 16 illustrates an exemplary cylinder with internal cavities to facilitate water cooling of the cylinder, which may be used in a roll-to-roll printing apparatus, in accordance with one or more implementations.

The cylinder may have internal cavities that enable cooled circulating water to enter through one side and exit through the other side of the cylinder (see, e.g., FIG. 16). Such cooling may help keep the engraving film cold during the engraving and/or molding operation. If the use of a transparent cylinder or roller is not desired, some other type of roller may be used and still enable curing of transparent and/or opaque materials using the total internal reflection of the light. When the substrate encloses the engraving and/or molding, there may be an area between them for curing the lacquer in the area of the outlet, where a narrow and concentrated ultraviolet light beam illuminates the sandwich that has resulted from the pressure between the rollers in the outlet position two or three inches and begins to cure when the lacquer comes into contact with the optical characteristics due to the total internal reflection of the light. The embossing and/or molding roller may be cooled internally by circulating water to keep the temperature of its surface sufficiently cold. In some implementations, a transparent cylinder (e.g., solid or with cavities for cooling water) may be illuminated on one side so the cylinder acts as a lens projecting on the other side of the cylinder a thin narrow high intensity strip of light (e.g., for curing purposes) (see, e.g., FIG. 16A).

Figure 17:
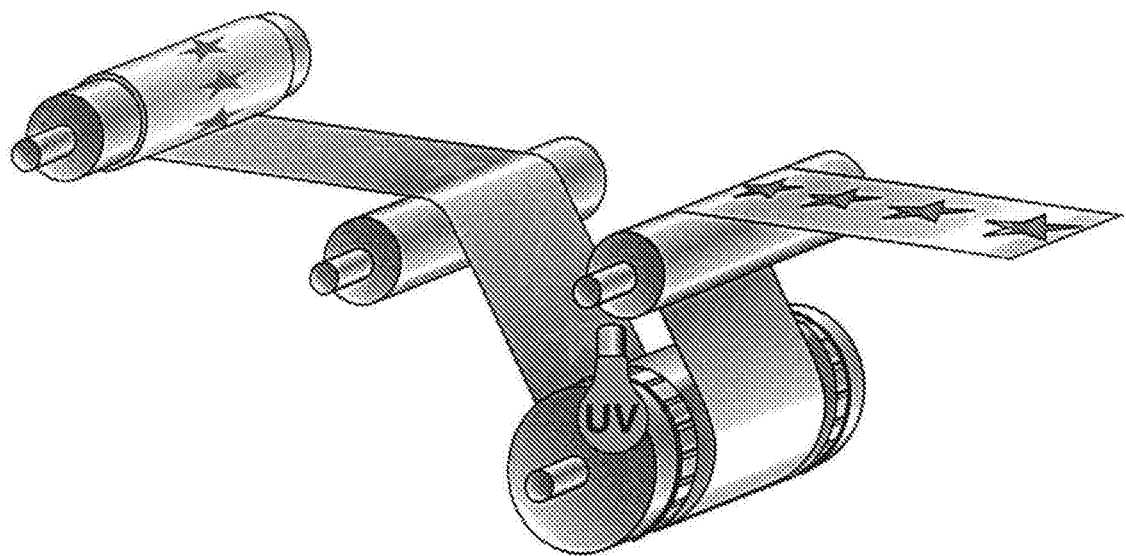
FIG. 17 illustrates an exemplary roll-to-roll printing configuration, in accordance with one or more implementation.

According to some implementations, instead of using an embossing and/or molding station with the optical image created by image generation component 1104, a generic optical matrix may be used which is selected depending on the desired optical effect(s). At a station, a printing block with the positive characteristics may be created. The printing block may transfer the image to the substrate via a radiation curable material (e.g., a curable UV lacquer, a thixotropic lacquer, a lacquer for engraving, and/or other material). When this section arrives at the ultraviolet drying station in register, the lacquer may dry in the generic optical matrix in the areas where it is precisely positioned (see, e.g., FIG. 17).

Figure 18:
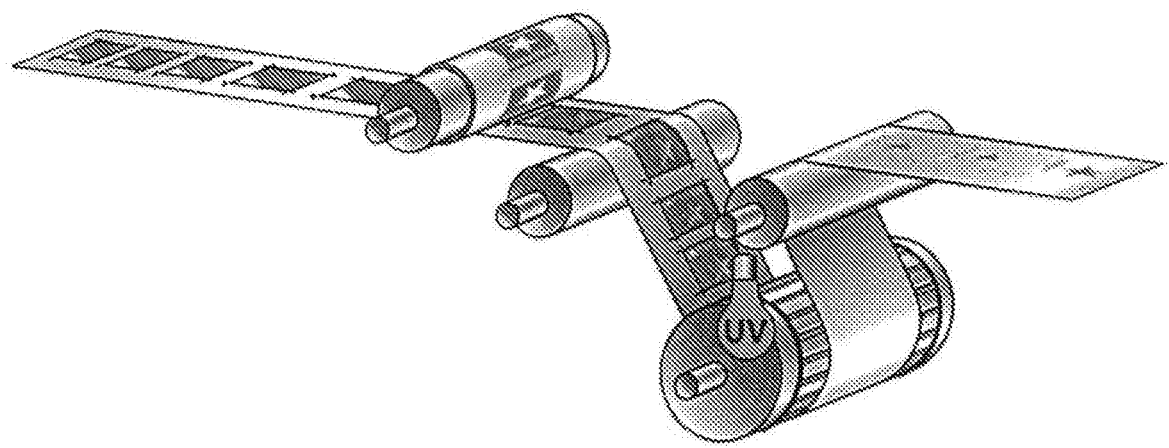
FIG. 18 illustrates an exemplary roll-to-roll printing configuration, in accordance with one or more implementation.
Figure 19:
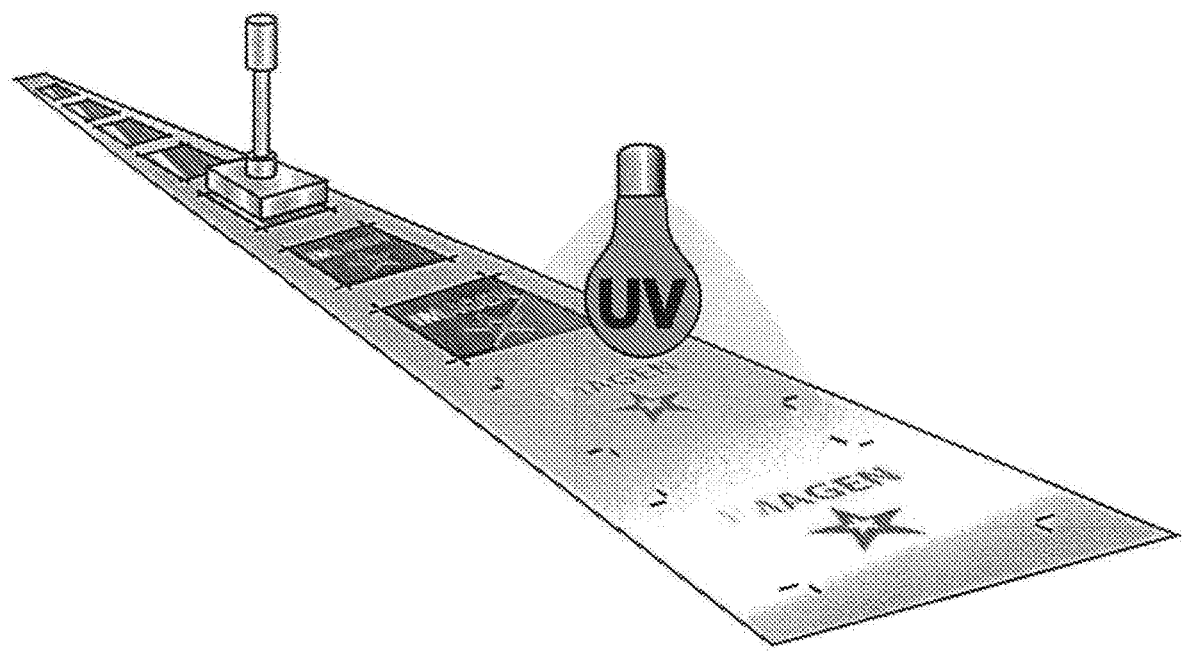
FIG. 19 illustrates an exemplary roll-to-roll printing configuration, in accordance with one or more implementation.

In some implementations, a substrate may be used that was previously engraved and/or molded with ultraviolet light and already has a generic optical matrix on its surface with appropriate registration marks. If the printing machine has re-registration capabilities in one of its printing stations, a printing block may be used that is made from the shape of a negative retained by image negative component 1102. This block may transfer the lacquer in register only in the areas that are needed to erase (or obliterate) the optical structures of certain sub-pixels thereby preserving some sub-pixels that create the final optical image. Recall that the negative block may contain some or all of the necessary information of the final optical image (see, e.g., FIG. 18). If the re-registration capability of the machine is not used, the lacquer may be applied randomly or in a specific pattern, creating all sorts of optical effects on the generic optical matrix substrate. In addition, the substrate may include conventional inks in the printout, creating all types of labels (see, e.g., FIG. 19).

The negative 1106 being in an electronic format may facilitate a number of techniques for producing optical images. Examples of electronic formats may include one or more of JPEG, TIFF, GIF, BMP, PNG, DDS, TARGA, DWG, PRT, CMX, EPS, SVG, STL, ART, AI, PSD, PMD, QXD, DOC, 3DS, BLEND, DFF, FBX, MA, MAX, SKP, VRML, BAT, JSFL, CLS, JAVA, MPEG, RM, SWF, PAGES, PCX, PDD, SCT, DXF, DWF, SLDASM, WRL, and/or other electronic formats. The image generation component 1104 may include an apparatus configured to print one or more of ink, toner, water-based ink, solvent-based ink, UV curable ink, thermal transfer ribbon inks, digital printer inks, ink jet inks, and/or other material directly on the generic optical matrix such that pixels and/or sub-pixels that are printed over become obliterated. The image generation component 1104 may include an apparatus configured to facilitate one or more of hot-stamping, cold stamping, laser ablation, chemical etching, and/or other printing techniques. Examples of apparatuses included in image generation component 1104 may include one or more of an inkjet printer, a laser printer, flexographic equipment, offset equipment, silk-screen equipment, digital printing equipment, rotogravure equipment, lithographic equipment, coding equipment, demetallizing equipment, silver halide printing equipment, hot-stamping equipment, cold stamping equipment, and/or other apparatuses configured to print material.

The negative in an electronic format may be modifiable such that successively generated optical images are variable in that individual optical images are different from other optical images. For example, the optical image and the successive optical images may include a variable code that is different for different optical images. Examples off the variable codes may include one or more of a linear barcode, a matrix barcode (e.g., a QR code), an alphanumeric code, a graphical code, a 2D code, sequential barcodes, sequential numbers, an encrypted code, a datamatrix code, a matrix 2D code, an Aztec code, a maxi code, and/or other variable codes. The optical image and the successive optical images may include a variable overt security feature and/or a variable covert security feature. An overt security feature may be configured to be used to identify an original document (or other object) by sight and/or touch. A covert security feature may become apparent when a document (or other object) is photocopied or scanned. That is, an additional action is required to activate a covert security feature.

Figure 20:
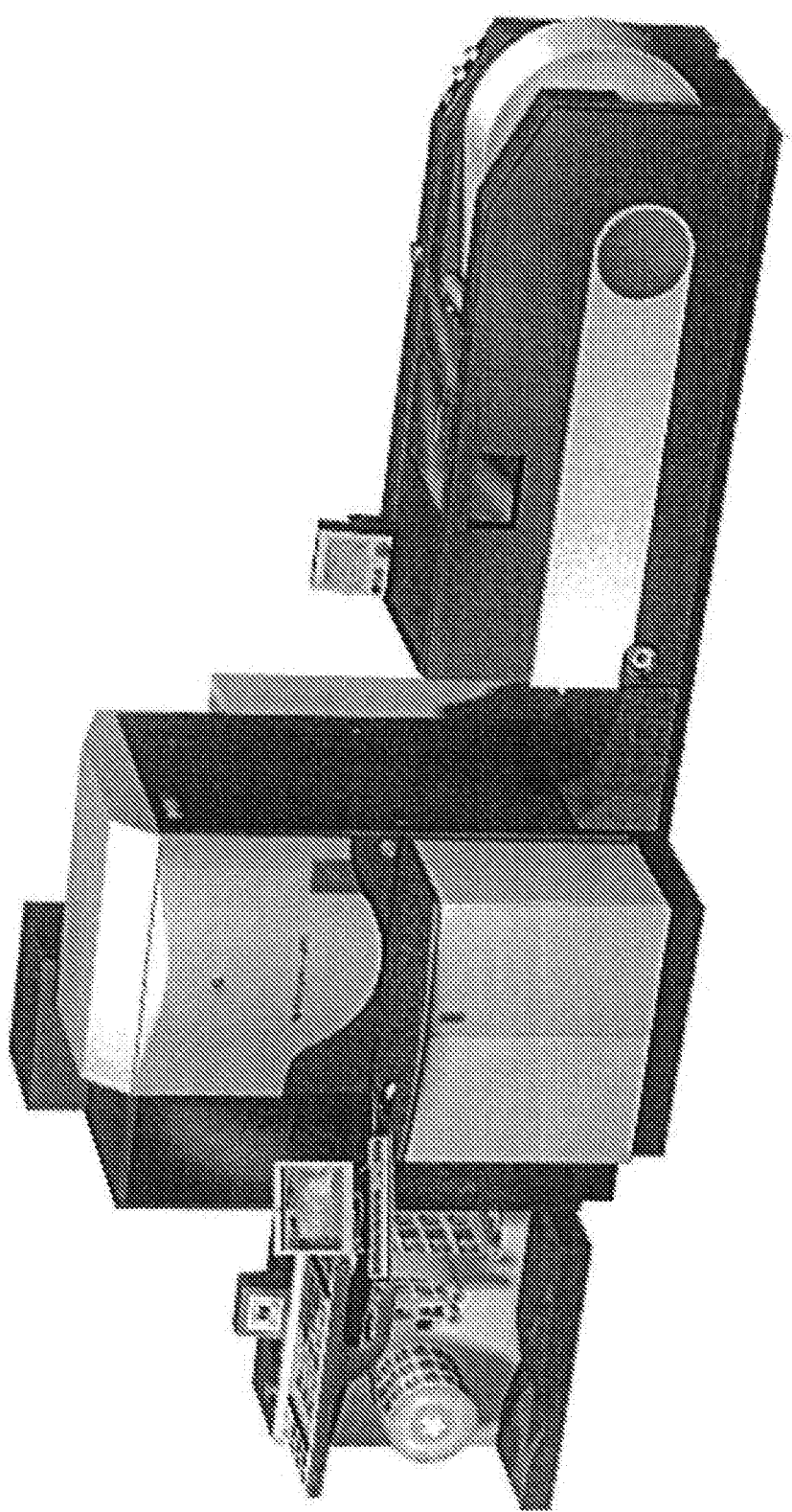
FIG. 20 illustrates an exemplary digital printing configuration, in accordance with one or more implementation.
Figure 21:
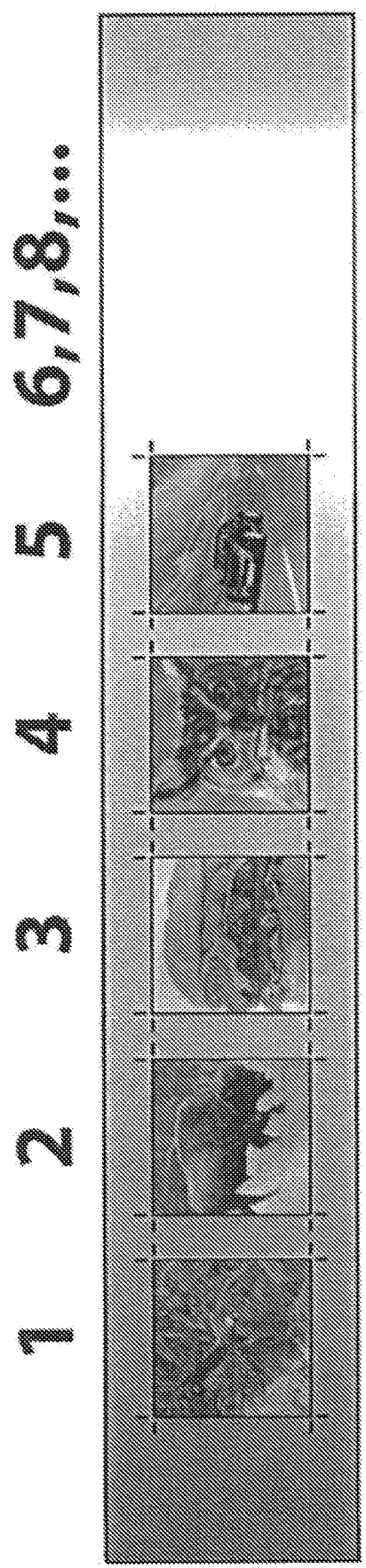
FIG. 21 illustrates a print job of many labels in which an optical image is different on different individual labels, in accordance with one or more implementations.

Some implementations may be used with digital printing equipment (see, e.g., FIG. 20). Examples of digital printing equipment may include equipment configured to facilitate one or more of inkjet printing, digital offset printing, digital thermal transfer printing, laser printing, photographic paper printing, dye sublimation printing, thermal printing, nanography (e.g., as provided by Landa Corporation of Israel), electro ink thermal transfer printing, toner printing, dry-toner electrophotography, and/or other types of printing. As a generic optical matrix passes through a printer or other printing equipment, a negative may be continuously printed in register with the generic optical matrix. When the negative is variable, the optical image may vary from print to print. This may make it possible for the printing equipment to print different digital optical images as the substrate passes through the printing equipment. In contrast to conventional techniques, exemplary implementations may digitally vary the ink printing and/or vary the optical images. By way of non-limiting example, one may print 10,000 labels in which an optical image is different on every label (see, e.g., FIG. 21). This may enable greater security in industrial labeling and packaging, as well as in security documents such as driver's licenses, passports, paper currency, government documents, and/or other security documents. Some implementations may be applicable to track and trace of products based on the optical variability of codes and/or other information encrypted onto the optical images.

If a simple printable substrate is used (i.e., a plain substrate with no pre-printed generic optical matrix), the optical images may be varied print to print. According to some implementations, the digital printer may print different negatives on a substrate as the substrate travels through the machine. The printing of the negative may be performed with inks, metallic inks, transparent inks, lacquers, and/or other techniques. After the printing is done, embossing and/or molding equipment may be used. A transfer mechanism (e.g., film on the roller, nickel, and/or other mechanisms) with a generic optical matrix may press against lacquer already in place, creating variable optical images as substrate goes through the machine. In some implementations, optical structures may be printed in register to conventional inks.

Some implementations may be used with desktop printers. Examples of desktop printers may include one or more of inkjet printers, laser printers, thermal transfer ribbon printers, thermal printers, sublimation printers, photographic printers, silver halide substrate printers, and/or other desktop printers. Optical images generated by image generation component 1104 may be included on one or more of security documents, decorative papers, CD covers, over-laminates, security laminates, labels, posters, greeting cards, and/or other printable surfaces. A generic optical matrix may be engraved and/or molded on substrates such as paper (real or synthetic), films (e.g., acetates, polycarbonates, PVC, and/or other films), and/or other substrates with or without adhesive or temperature-activated coatings. A substrate may be cut it into appropriate sheets compatible with desktop printers.

For example, a sheet of paper with a generic optical matrix may be fed into a desktop printer. The desktop printer may receive information (e.g., a negative in an electronic format) from a computer, camera, and/or another device. Based on that information, the negative image may be printed in register with the sheet of paper with ink and/or engraved with a laser. That way, for example, if the idea is to have a 3D optical image in the right-hand corner of the sheet with hidden information, it may be printed at the same time as the rest of the text or drawing that is being printed on the sheet of paper. The final result may be a sheet of paper in full color or in black and white with an optical image in the right-hand corner of the sheet. There may be infinite variations from sheet to sheet. The optical images may be created as an optical watermark that may cover the document completely. If the sheet of paper is an invitation to a party, for example, it may have colorful optical effects in any part desired (e.g., to coincide with an image of balloons).

Using a desktop printer may not require radiation exposure or curing. If a laser printer is used, one or more additional laser heads may be added, which lightly engrave over optical structures of a generic optical matrix on a sheet of paper (or other substrate). Such engraving may be performed to obliterate pixels and/or sub-pixels. If the printer is an inkjet printer, a new color may be added to the printer head. As an example of a color, it may be white and/or any other color. In some implementations, a pressure-sensitive generic optical matrix may be used. By way of non-limiting example, a printer may create many labels on one page which can be optically sequential and/or have decorative and/or optical 3D images.

In some implementations, a transparent substrate may be used for the generic optical matrix. For example, for passports, visas, driver's licenses, and/or other documents, a superposed sheet of material may have any type of optical image produced by image generation component 1104. An optical image may include hidden information. An optical image may include sequential optical images. Documents with photographs may be created optically, so the photograph itself may include a 2D optical image, a 3D optical image, an animated optical image, an optical variable code, and/or other optical images of a person. Since that does not currently exist, a system with such capabilities is very advantageous.

Some implementations may be used in optical encoding. Codes may be applied to all types of objects or products. Codes may be variable in that they may include one or more of variable data, sequential numbers, variable codes, variable bar codes, variable images, optically variable matrix barcodes (e.g., QR codes), 2D codes, barcodes, sequential numbers, variable databases, and/or other information. Some implementations may be used for tracking purposes. Codes may be encrypted or unencrypted. In some implementations, objects or products may be encoded with sequentially variable optical images. This may add an extra layer of security due to the fact that these optical images may also have sequentially hidden security characteristics. Even without the characteristic of hidden security, exemplary embodiments used with encoding offer a layer of security to the object or product that is impossible to duplicate on conventional printing equipment.

By way of non-limiting example, a generic optical structure may be engraved on a pressure-sensitive material, which may be used for generic optical matrix labels. Such labels may be delivered to a consumer, who in turn may apply them to their objects or products. Once the object or product passes through an encoding line within an inkjet and/or laser encoding system, the generation of positive images may occur based on digital information provided to the head of the encoder. The encoding head may erase optical structures of the generic optical matrix by placing ink over them and/or using a laser to erase them. The result may be that, as the product travels with its generic optical matrix label, an encoding system available in the marketplace may create optical images in accordance with one or more implementations over them and, at the same time, these images can be sequentially variable.

As mentioned above connection with FIG. 11, image negative component 1102 may include electronic storage configured to store the negative in an electronic format (e.g., in implementations in which negative 1106 is in an electronic format). Electronic storage may comprise non-transitory storage media that electronically stores information. The electronic storage media of electronic storage may include one or both of system storage that is provided integrally (i.e., substantially non-removable) with a computing device and/or printing apparatus and/or removable storage that is removably connectable to a computing device and/or printing apparatus via, for example, a port (e.g., a USB port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). Electronic storage may store software algorithms, information determined by processor(s), information received from a computing device and/or printing apparatus, and/or other information that enables image negative component 1102 to function as described herein.

The image negative component 1102 may include one or more processors configured to provide processing capabilities in image negative component 1102. The one or more processors may be configured to provide information associated with the negative to one or more other components of system 1100 (e.g., in implementations in which negative 1106 is in an electronic format). Examples of such information may include printing instructions to print the negative, instructions to copy or store the negative, instructions to change or modify the negative (e.g., change a value of a code on the negative), and/or other information. The processor(s) may include one or more of a digital processor, an analog processor, a digital circuit designed to process information, an analog circuit designed to process information, a state machine, and/or other mechanisms for electronically processing information. In some implementations, the processor(s) may include a plurality of processing units, which may be physically located within the same device or a plurality of devices operating in coordination. The processor(s) may be configured to execute machine-readable instructions. The processor(s) may be configured to execute machine-readable instructions by software; hardware; firmware; some combination of software, hardware, and/or firmware; and/or other mechanisms for configuring processing capabilities on the processor(s).

In some implementations, a generic optical matrix may be used to provide nanostructures. Examples of such nanostructures may include one or more of photonic structures, hydrophobic structures, gecko-type structures, and/or other nanostructures. By way of non-limiting example, a hydrophobic structure may be combined with a gecko type structure to create an optical variable matrix with these two structures. This may facilitate guiding one or more liquids thorough different passages in order to guide the one or more liquids to different sensors. As another example involving photonic structures, two or more may be combined in an optical variable matrix structure to provide one or more waveguides.

Figure 22:
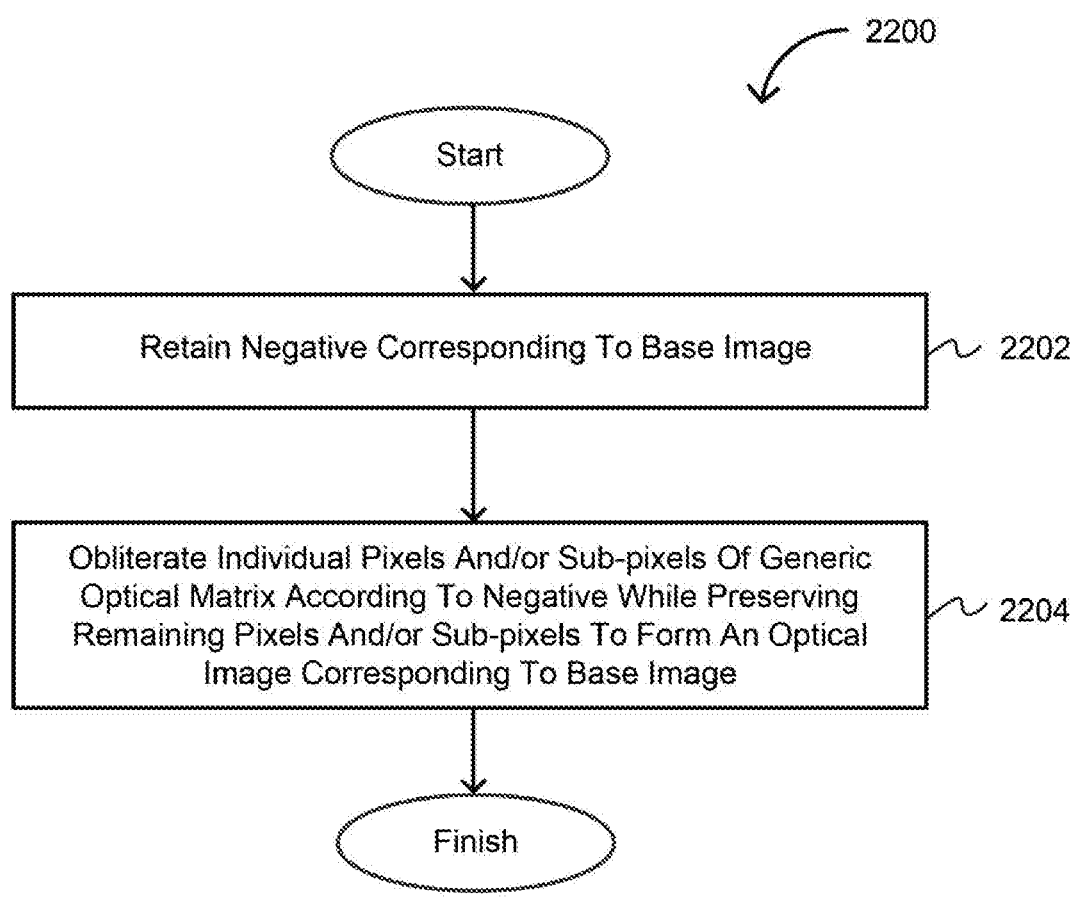
FIG. 22 illustrates a method for fabricating variable digital optical images using generic optical matrices, in accordance with one or more implementations.

FIG. 22 illustrates a method 2200 for fabricating variable digital optical images using generic optical matrices, in accordance with one or more implementations. The operations of method 2200 presented below are intended to be illustrative. In some implementations, method 2200 may be accomplished with one or more additional operations not described, and/or without one or more of the operations discussed. Additionally, the order in which the operations of method 2200 are illustrated in FIG. 22 and described below is not intended to be limiting.

In some implementations, one or more operations of method 2200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 2200 in response to instructions stored electronically on an electronic storage medium. The one or more processing devices may include one or more devices configured through hardware, firmware, and/or software to be specifically designed for execution of one or more of the operations of method 2200.

At an operation 2202, a negative corresponding to a base image may be retained. The negative may be based on the base image and a geometry associated with a generic optical matrix. The generic optical matrix may have pixels corresponding to color and sub-pixels corresponding to non-color effects. The pixels may include first pixels corresponding to a first color and second pixels corresponding to a second color. The sub-pixels may include first sub-pixels corresponding to a first non-color effect and second sub-pixels corresponding to a second non-color effect. The geometry may indicate locations and colors of pixels in the generic optical matrix. The geometry may indicate locations and non-color effects of sub-pixels within the pixels. Operation 2202 may be performed by an image negative component that is the same as or similar to image negative component 1102, in accordance with one or more implementations.

At an operation 2204, individual ones of the pixels and/or sub-pixels of the generic optical matrix may be obliterated according to the negative while preserving remaining pixels and/or sub-pixels. The remaining pixels and/or sub-pixels may form an optical image corresponding to the base image. The optical image may be colored based on the remaining pixels. The optical image may exhibit non-color effects corresponding to the remaining sub-pixels. Operation 2204 may be performed by an image generation component that is the same as or similar to image generation component 1104, in accordance with one or more implementations.

One aspect ("aspect one") relates to a generic optical matrix having pixels corresponding to color and sub-pixels corresponding to non-color effects, the generic optical matrix comprising: a substrate; and an array of pixels disposed on the substrate, the array comprising first pixels corresponding to a first color and second pixels corresponding to a second color, the first color being different from the second color, the first pixels and second pixels being arranged in a motif such that individual ones of the first pixels are positioned adjacent to individual ones of the second pixels; wherein individual ones of the pixels comprise sub-pixels, a given pixel comprising a first sub-pixel and a second sub-pixel, the first sub-pixel comprising a first optical structure configured such that light reflected or transmitted by the first optical structure of the first sub-pixel is directed toward a left eye of a person observing the generic optical matrix from a first viewing angle, the second sub-pixel comprising a second optical structure configured such that light reflected or transmitted by the second optical structure of the second sub-pixel is directed toward a right eye of the person observing the generic optical matrix from the first viewing angle, the light reflected or transmitted by the first sub-pixel and the second sub-pixel being the corresponding color of the given pixel.

Another aspect ("aspect two") relates to the generic optical matrix of aspect one, wherein the substrate includes one or more of photoresist, nickel plate, polyester film, silicon, polycarbonate film, or ultraviolet substrate.

Another aspect ("aspect three") relates to the generic optical matrix of aspect one, wherein: the array further comprises third pixels corresponding to a third color; the third color is different from the first color and the second color; and the third pixels are arranged in the motif such that individual ones of the third pixels are positioned adjacent to individual ones of the first pixels and individual ones of the second pixels.

Another aspect ("aspect four") relates to the generic optical matrix of aspect three, wherein: the array further comprises fourth pixels corresponding to a fourth color; the fourth color is different from the first color, the second color, and the third color; and the fourth pixels are arranged in the motif such that individual ones of the fourth pixels are positioned adjacent to individual ones of the first pixels, individual ones of the second pixels, and individual ones of the third pixels.

Another aspect ("aspect five") relates to the generic optical matrix of aspect one, wherein the given pixel comprises a third sub-pixel and a fourth sub-pixel, the third subpixel comprising a third optical structure configured such that light reflected or transmitted by the third optical structure of the third sub-pixel is directed toward a left eye of a person observing the generic optical matrix from the second viewing angle, the fourth sub-pixel comprising a fourth optical structure configured such that light reflected or transmitted by the fourth optical structure of the fourth sub-pixel is directed toward a right eye of the person observing the generic optical matrix from the second viewing angle, the light reflected or transmitted by the third sub-pixel and the fourth sub-pixel being the corresponding color of the given pixel.

Another aspect ("aspect six") relates to the generic optical matrix of aspect one, wherein a given optical structure includes one or more of a grating, a hologram, a kinegram, a Fresnel lens, a diffractive optically variable image device, a pixelgram, a holographic stereogram, a diffraction identification device, a dielectric structure, a volume hologram, an interference security image structure, a computer-generated hologram, or an electron-beam grating.

Another aspect ("aspect seven") relates to the generic optical matrix of aspect one, wherein the array of pixels is arranged as one of a square lattice, a hexagonal lattice, triangular lattice, rectangular lattice, a random arrangement, or a pseudorandom arrangement.

Another aspect ("aspect eight") relates to the generic optical matrix of aspect one, wherein individual ones of the pixels are shaped as a circle, a square, a rectangle, a line, an oval, a rounded square, or dots.

Another aspect ("aspect nine") relates to the generic optical matrix of aspect one, wherein the optical matrix covers an area with one linear dimension being in the range of 0.01 microns to 90 inches.

Another aspect ("aspect ten") relates to the generic optical matrix of aspect one, wherein the array of pixels has a resolution in the range of one pixel per inch to 500,000 pixels per inch.

One aspect ("aspect eleven") relates to a method for fabricating a generic optical matrix having pixels corresponding to color and sub-pixels corresponding to non-color effects, the method comprising: obtaining a substrate; defining an array of pixels disposed on the substrate, the array comprising first pixels corresponding to a first color and second pixels corresponding to a second color, the first color being different from the second color, the first pixels and second pixels being arranged in a motif such that individual ones of the first pixels are positioned adjacent to individual ones of the second pixels; and forming sub-pixels within individual ones of the pixels, a given pixel comprising a first sub-pixel and a second sub-pixel, the first sub-pixel comprising a first optical structure configured such that light reflected or transmitted by the first optical structure of the first sub-pixel is directed toward a left eye of a person observing the generic optical matrix from the first viewing angle, the second sub-pixel comprising a second optical structure configured such that light reflected or transmitted by the second optical structure of the second sub-pixel is directed toward a right eye of the person observing the generic optical matrix from the first viewing angle, the light reflected or transmitted by the first sub-pixel and the second sub-pixel being the corresponding color of the given pixel.

Another aspect ("aspect twelve") relates to the method of aspect eleven, wherein: the array further comprises third pixels corresponding to a third color; the third color is different from the first color and the second color; and the third pixels are arranged in the motif such that individual ones of the third pixels are positioned adjacent to individual ones of the first pixels and individual ones of the second pixels.

Another aspect ("aspect thirteen") relates to the method of aspect eleven, wherein: the given pixel comprises a third sub-pixel and a fourth sub-pixel; the third sub-pixel comprises a third optical structure configured such that light reflected or transmitted by the third optical structure is directed toward a left eye of a person observing the generic optical matrix from a second viewing angle; the fourth sub-pixel comprises a fourth optical structure configured such that light reflected or transmitted by the fourth optical structure is directed toward a right eye of a person observing the generic optical matrix from the second viewing angle; and the light reflected or transmitted by the third sub-pixel and the fourth sub-pixel One aspect ("aspect fourteen") relates to a system configured for generating negatives of variable digital holographic images based on desired images and generic optical matrices, the system comprising: one or more physical processors configured by machine-readable instructions to: obtain an original image; obtain a geometry associated with a generic optical matrix, the generic optical matrix having pixels corresponding to color and sub-pixels corresponding to non-color effects, the pixels including first pixels corresponding to a first color and second pixels corresponding to a second color, the sub-pixels including first sub-pixels corresponding to a first non-color effect and second sub-pixels corresponding to a second non-color effect, the geometry indicating locations and colors of pixels in the generic optical matrix, the geometry further indicating locations and non-color effects of sub-pixels within the pixels; perform color separation on the original image to provide two or more separations including a first separation and a second separation, the first separation corresponding to the first color and the second separation corresponding to the second color; index the separations to the geometry associated with the generic optical matrix to provide indexed separations, the first separation being indexed to the geometry with respect to the first color and the first non-color effect to provide an indexed first separation associated with the first non-color effect, the first separation being indexed to the geometry with respect to the first color and the second non-color effect to provide an indexed first separation associated with the second non-color effect, the second separation being indexed to the geometry with respect to the second color and the first non-color effect to provide an indexed second separation associated with the first non-color effect, the second separation being indexed to the geometry with respect to the second color and the second non-color effect to provide an indexed second separation associated with the second non-color effect; and merge the indexed separations to provide a negative of the original image.

Another aspect ("aspect fifteen") relates to the system of aspect fourteen, wherein: the pixels further include third pixels corresponding to a third color; and the two or more separations further include a third separation corresponding to the third color.

Another aspect ("aspect sixteen") relates to the system of aspect fourteen, wherein: the pixels further include fourth pixels corresponding to a fourth color; and the two or more separations further include a fourth separation corresponding to the fourth color.

Another aspect ("aspect seventeen") relates to the system of aspect fourteen, wherein a given separation corresponding to a given color is indexed to the geometry associated with the generic optical matrix with respect to a given non-color effect by preserving areas of the given separation that spatially correspond to pixels of the generic optical matrix corresponding to the given color and sub-pixels within the pixels corresponding to the given non-color effect, unpreserved areas of the given separation being obliterated.

Another aspect ("aspect eighteen") relates to the system of aspect seventeen, wherein the indexed first separation associated with the first non-color effect, the indexed first separation associated with the second non-color effect, the indexed second separation associated with the first non-color effect, and the indexed second separation associated with the second non-color effect are merged by combining the preserved areas while maintaining the spatial position of the preserved areas.

Another aspect ("aspect nineteen") relates to the system of aspect fourteen, wherein a given separation corresponding to a given color is indexed to the geometry associated with the generic optical matrix with respect to a given non-color effect by obliterating areas of the given separation that spatially correspond to pixels of the generic optical matrix corresponding to the given color and sub-pixels within the pixels corresponding to the given non-color effect, unobliterated areas of the given separation being preserved.

Another aspect ("aspect twenty") relates to the system of aspect nineteen, wherein the indexed first separation associated with the first non-color effect, the indexed first separation associated with the second non-color effect, the indexed second separation associated with the first non-color effect, and the indexed second separation associated with the second non-color effect are merged by combining the obliterated areas while maintaining the spatial position of the obliterated areas.

Another aspect ("aspect twenty one") relates to the system of aspect fourteen, wherein: the first sub-pixels corresponding to the first non-color effect are configured to cause light reflected or transmitted by the first sub-pixels to be directed toward a left eye of a person observing the generic optical matrix from a first viewing angle; and the second sub-pixels corresponding to the second non-color effect are configured to cause light reflected or transmitted by the second sub-pixels to be directed toward a right eye of the person observing the generic optical matrix from the first viewing angle.

One aspect ("aspect twenty two") relates to a method for generating negatives of variable digital holographic images based on desired images and generic optical matrices, the method being performed by one or more physical processors configured by machine-readable instruction, the method comprising: obtaining an original image; obtaining a geometry associated with a generic optical matrix, the generic optical matrix having pixels corresponding to color and sub-pixels corresponding to non-color effects, the pixels including first pixels corresponding to a first color and second pixels corresponding to a second color, the sub-pixels including first sub-pixels corresponding to a first non-color effect and second sub-pixels corresponding to a second non-color effect, the geometry indicating locations and colors of pixels in the generic optical matrix, the geometry further indicating locations and non-color effects of sub-pixels within the pixels; performing color separation on the original image to provide two or more separations including a first separation and a second separation, the first separation corresponding to the first color and the second separation corresponding to the second color; indexing the separations to the geometry associated with the generic optical matrix to provide indexed separations, the first separation being indexed to the geometry with respect to the first color and the first non-color effect to provide an indexed first separation associated with the first non-color effect, the first separation being indexed to the geometry with respect to the first color and the second non-color effect to provide an indexed first separation associated with the second non-color effect, the second separation being indexed to the geometry with respect to the second color and the first non-color effect to provide an indexed second separation associated with the first non-color effect, the second separation being indexed to the geometry with respect to the second color and the second non-color effect to provide an indexed second separation associated with the second non-color effect; and merging the indexed separations to provide a negative of the original image.

Another aspect ("aspect twenty three") relates to the method of aspect twenty two, wherein: the pixels further include third pixels corresponding to a third color; and the two or more separations further include a third separation corresponding to the third color.

Another aspect ("aspect twenty four") relates to the system of aspect twenty three, wherein: the pixels further include fourth pixels corresponding to a fourth color; and the two or more separations further include a fourth separation corresponding to the fourth color.

Another aspect ("aspect twenty five") relates to the system of aspect twenty two, wherein a given separation corresponding to a given color is indexed to the geometry associated with the generic optical matrix with respect to a given non-color effect by preserving areas of the given separation that spatially correspond to pixels of the generic optical matrix corresponding to the given color and sub-pixels within the pixels corresponding to the given non-color effect, unpreserved areas of the given separation being obliterated.

Another aspect ("aspect twenty six") relates to the system of aspect twenty five, wherein the indexed first separation associated with the first non-color effect, the indexed first separation associated with the second non-color effect, the indexed second separation associated with the first non-color effect, and the indexed second separation associated with the second non-color effect are merged by combining the preserved areas while maintaining the spatial position of the preserved areas.

Another aspect ("aspect twenty seven") relates to the system of aspect twenty two, wherein a given separation corresponding to a given color is indexed to the geometry associated with the generic optical matrix with respect to a given non-color effect by obliterating areas of the given separation that spatially correspond to pixels of the generic optical matrix corresponding to the given color and sub-pixels within the pixels corresponding to the given non-color effect, unobliterated areas of the given separation being preserved.

Another aspect ("aspect twenty eight") relates to the system of aspect twenty seven, wherein the indexed first separation associated with the first non-color effect, the indexed first separation associated with the second non-color effect, the indexed second separation associated with the first non-color effect, and the indexed second separation associated with the second non-color effect are merged by combining the obliterated areas while maintaining the spatial position of the obliterated areas.

Another aspect ("aspect twenty nine") relates to the system of aspect twenty two, wherein: the first sub-pixels corresponding to the first non-color effect are configured to cause light reflected or transmitted by the first sub-pixels to be directed toward a left eye of a person observing the generic optical matrix from a first viewing angle; and the second sub-pixels corresponding to the second non-color effect are configured to cause light reflected or transmitted by the second sub-pixels to be directed toward a right eye of the person observing the generic optical matrix from the first viewing angle.

One aspect ("aspect thirty") relates to a non-transitory computer-readable storage medium having instructions embodied thereon, the instructions being executable by one or more physical processors to perform a method for generating negatives of variable digital holographic images based on desired images and generic optical matrices, the method comprising: obtaining an original image; obtaining a geometry associated with a generic optical matrix, the generic optical matrix having pixels corresponding to color and sub-pixels corresponding to non-color effects, the pixels including first pixels corresponding to a first color and second pixels corresponding to a second color, the sub-pixels including first sub-pixels corresponding to a first non-color effect and second sub-pixels corresponding to a second non-color effect, the geometry indicating locations and colors of pixels in the generic optical matrix, the geometry further indicating locations and non-color effects of sub-pixels within the pixels; performing color separation on the original image to provide two or more separations including a first separation and a second separation, the first separation corresponding to the first color and the second separation corresponding to the second color; indexing the separations to the geometry associated with the generic optical matrix to provide indexed separations, the first separation being indexed to the geometry with respect to the first color and the first non-color effect to provide an indexed first separation associated with the first non-color effect, the first separation being indexed to the geometry with respect to the first color and the second non-color effect to provide an indexed first separation associated with the second non-color effect, the second separation being indexed to the geometry with respect to the second color and the first non-color effect to provide an indexed second separation associated with the first non-color effect, the second separation being indexed to the geometry with respect to the second color and the second non-color effect to provide an indexed second separation associated with the second non-color effect; and merging the indexed separations to provide a negative of the original image.

Another aspect ("aspect thirty one") relates to the storage medium of aspect thirty, wherein a given separation corresponding to a given color is indexed to the geometry associated with the generic optical matrix with respect to a given non-color effect by preserving areas of the given separation that spatially correspond to pixels of the generic optical matrix corresponding to the given color and sub-pixels within the pixels corresponding to the given non-color effect, unpreserved areas of the given separation being obliterated.

Another aspect ("aspect thirty two") relates to the storage medium of aspect thirty one, wherein the indexed first separation associated with the first non-color effect, the indexed first separation associated with the second non-color effect, the indexed second separation associated with the first non-color effect, and the indexed second separation associated with the second non-color effect are merged by combining the preserved areas while maintaining the spatial position of the preserved areas.

Another aspect ("aspect thirty three") relates to the storage medium of aspect thirty, wherein a given separation corresponding to a given color is indexed to the geometry associated with the generic optical matrix with respect to a given non-color effect by obliterating areas of the given separation that spatially correspond to pixels of the generic optical matrix corresponding to the given color and sub-pixels within the pixels corresponding to the given non-color effect, unobliterated areas of the given separation being preserved.

One aspect ("aspect thirty four") relates to a system configured for fabricating variable digital optical images using generic optical matrices, the variable digital optical images including different optical images instantly produced in a single printing cycle, the system comprising: an image negative component configured to retain a negative corresponding to a base image, the negative being based on the base image and a geometry associated with a pre-prepared physical generic optical matrix, the generic optical matrix having an arrayed motif of pixels corresponding to color and sub-pixels corresponding to non-color effects, the pixels including first pixels corresponding to a first color and second pixels corresponding to a second color, the sub-pixels including first sub-pixels corresponding to a first non-color effect and second sub-pixels corresponding to a second non-color effect, the geometry indicating locations and colors of pixels in the generic optical matrix, the geometry further indicating locations and non-color effects of sub-pixels within the pixels, wherein a given non-color effect corresponds to one or more of viewing angle, viewing distance, polarization, intensity, scattering, refractive index, or birefringence; and an image generation component configured to obliterate individual ones of the pixels and/or sub-pixels of the generic optical matrix according to the negative while preserving remaining pixels and/or sub-pixels, the remaining pixels and/or sub-pixels forming an optical image corresponding to the base image, the optical image being colored based on the remaining pixels, the optical image exhibiting non-color effects corresponding to the remaining sub-pixels, wherein the image generation component is configured to selectively obliterate a given pixel and/or sub-pixel by one or more of printing a pigment over the given pixel and/or sub-pixel, curing a radiation-curable material over the given pixel and/or sub-pixel, chemical etching away the given pixel and/or sub-pixel, or laser ablating the given pixel and/or sub-pixel.

Another aspect ("aspect thirty five") relates to the system of aspect thirty four, wherein the optical image comprises one or more of a hologram, a stereo image, a hologram, a stereo image, an optically variable device based image, a diffractive optically variable image, a zero order device based image, a blazed diffraction structure based image, a first order device based image, a dot matrix image, a pixelgram image, a structural color structure based image, a diffractive identification device based image, an interference security image structure based image, a kinegram image, an excelgram image, a diffractive optical element based image, a photonic structure based image, a nanohole based image, a computer generated hologram, an electron-beam generated optical structure, or an interference patterns.

Another aspect ("aspect thirty six") relates to the system of aspect thirty four, wherein the non-color effects of the remaining sub-pixels give rise to one or more optical effects observable when viewing the optical image, the one or more optical effects including one or more of a three-dimensional optical effect, a two-dimensional optical effect, a dynamic optical effect, a scattering effect, a holographic white effect, a lens effect, a Fresnel lens effect, a brightness modulation effect, a lithographic effect, a stereogram effect, a nanotext and/or microtext effect, a hidden image effect, a moire effect, a concealed animated pattern effect, a covert laser readable (CLR) effect, a multiple background effect, a pearlescent effect, a true color image effect, a guilloche effect, an animation effect, an achromatic Fresnel effect, a dynamic CLR image, a kinematic images, a full parallax effect, a scratch holographic effect, a polarizing effect, a watermark effect, a metallic effect, a binary optical structure, or a Fresnel prism.

Another aspect ("aspect thirty seven") relates to the system of aspect thirty four, wherein individual ones of the remaining sub-pixels reflect light at a specific viewing angle with a color corresponding to that of the individual pixels associated with the remaining sub-pixels.

Another aspect ("aspect thirty eight") relates to the system of aspect thirty four, wherein the negative is embodied on a physical substrate.

Another aspect ("aspect thirty nine") relates to the system of aspect thirty four, wherein the physical substrate is a transparent film and the negative is printed on the transparent film.

Another aspect ("aspect forty") relates to the system of aspect thirty nine, further comprising an aligner component configured to align one or more registration marks on the negative with one or more corresponding registration marks on the generic optical matrix.

Another aspect ("aspect forty one") relates to the system of aspect thirty nine, wherein a radiation curable material is disposed between the negative and the generic optical matrix, the radiation curable material having an index of refraction, when cured, that is the same as or similar to an index of refraction of the generic optical matrix.

Another aspect ("aspect forty two") relates to the system of aspect forty one, wherein the radiation curable material is one or more of: a lacquer that is cured when exposed to ultraviolet light; transparent or translucent when cured; or colored when cured.

Another aspect ("aspect forty three") relates to the system of aspect forty two, wherein the image generation component is configured to obliterate the individual ones of the pixels and/or sub-pixels by exposing the physical substrate embodying the negative to radiation such that the radiation passes through portions of the physical substrate where the negative is not located and exposes corresponding portions of the radiation curable material, the portions of the radiation curable material becoming cured responsive to being exposed to the radiation, the cured radiation curable material obliterating collocated pixels and/or sub-pixels.

Another aspect ("aspect forty four") relates to the system of aspect thirty nine, wherein individual obliterated pixels and/or sub-pixels are rendered transparent, the obliterated pixels and/or sub-pixels rendered transparent allowing a substrate of the generic optical matrix to be visible at the obliterated pixels and/or sub-pixels rendered transparent.

Another aspect ("aspect forty five") relates to the system of aspect thirty nine, wherein the image generation component is further configured to print black over individual ones of the obliterated pixels and/or sub-pixels.

Another aspect ("aspect forty six") relates to the system of aspect thirty nine, wherein the image generation component is further configured to print black at various densities over individual ones of the remaining pixels and/or sub-pixels to affect a brightness of the individual ones of the remaining pixels and/or sub-pixels.

Another aspect ("aspect forty seven") relates to the system of aspect thirty nine, wherein the optical image is one or both of: usable in a printing press to transfer copies of the optical image to different substrates using an embossing process and/or a molding process; or usable to make nickel plates and/or engravable sleeves engraving applications and/or molding applications.

Another aspect ("aspect forty eight") relates to the system of aspect thirty four, wherein the negative is in an electronic format.

Another aspect ("aspect forty nine") relates to the system of aspect forty eight, wherein the image generation component includes an apparatus configured to print ink or toner directly on the generic optical matrix such that pixels and/or sub-pixels that are printed over become obliterated.

Another aspect ("aspect fifty") relates to the system of aspect forty nine, wherein the negative is modifiable such that successively generated optical images are variable in that individual optical images are different from other optical images.

Another aspect ("aspect fifty one") relates to the system of aspect thirty four, wherein the optical image and successive optical images include a variable code that is different for different optical images, the variable codes including one or more of a linear barcode, a matrix barcode, an alphanumeric code, a graphical code, a 2D code, sequential barcodes, sequential numbers, an encrypted code, a datamatrix code, a matrix 2D code, an Aztec code, or a maxi code.

Another aspect ("aspect fifty two") relates to the system of aspect fifty one, wherein the optical image and the successive optical images include one or both of a variable overt security feature or a variable covert security feature.

One aspect ("aspect fifty three") relates to a method for fabricating variable digital optical images using generic optical matrices, the variable digital optical images including different printed optical images instantly produced on the same image area in a single printing cycle, the method comprising: retaining a negative corresponding to a base image, the negative being based on the base image and a geometry associated with a pre-prepared physical generic optical matrix, the generic optical matrix having an arrayed motif of static physical pixels corresponding to color and sub-pixels corresponding to non-color effects, the pixels including first pixels corresponding to a first color and second pixels corresponding to a second color, the sub-pixels including first sub-pixels corresponding to a first non-color effect and second sub-pixels corresponding to a second non-color effect, the geometry indicating locations and colors of pixels in the generic optical matrix, the geometry further indicating locations and non-color effects of sub-pixels within the pixels, wherein a given non-color effect corresponds to one or more of viewing angle, viewing distance, polarization, intensity, scattering, refractive index, or birefringence; and obliterating during a single printing cycle individual ones of the pixels and/or sub-pixels of the generic optical matrix according to the negative while preserving remaining pixels and/or sub-pixels, the remaining pixels and/or sub-pixels forming an optical image corresponding to the base image, the optical image being colored based on the remaining pixels, the optical image exhibiting non-color effects corresponding to the remaining sub-pixels, wherein obliterating a given pixel and/or sub-pixel includes one or more of printing a pigment over the given pixel and/or sub-pixel, curing a radiation-curable material over the given pixel and/or sub-pixel, chemical etching away the given pixel and/or sub-pixel, or laser ablating the given pixel and/or sub-pixel.

Another aspect ("aspect fifty four") relates to the method of aspect fifty three, wherein the negative is embodied on a physical substrate.

Another aspect ("aspect fifty five") relates to the method of aspect fifty four, further comprising aligning one or more registration marks on the negative with one or more corresponding registration marks on the generic optical matrix, wherein a given registration mark is included in the generic optical matrix and a corresponding registration mark is included in the negative.

Another aspect ("aspect fifty six") relates to the method of aspect fifty four, further comprising disposing a radiation curable material between the negative and the generic optical matrix, the radiation curable material having an index of refraction, when cured, that is the same as or similar to an index of refraction of the generic optical matrix.

Another aspect ("aspect fifty seven") relates to the method of aspect fifty six, wherein obliterating the individual ones of the pixels and/or sub-pixels includes exposing the physical substrate embodying the negative to radiation such that the radiation passes through portions of the physical substrate where the negative is not located and exposes corresponding portions of the radiation curable material, the portions of the radiation curable material becoming cured responsive to being exposed to the radiation, the cured radiation curable material obliterating collocated pixels and/or sub-pixels.

Another aspect ("aspect fifty eight") relates to the method of aspect fifty four, wherein the negative is in an electronic format, the negative being modifiable such that successively generated optical images are variable in that individual optical images are different from other optical images.

Another aspect ("aspect fifty nine") relates to the method of aspect fifty eight, wherein obliterating the individual ones of the pixels and/or sub-pixels includes printing ink or toner directly on the generic optical matrix such that pixels and/or sub-pixels that are printed over become obliterated.

Another aspect ("aspect sixty") relates to the method of aspect fifty four, further comprising overprinting remaining pixels and/or sub-pixels with a material having a first refractive index, the first refractive index being higher than a refractive index of an optical structure of a given remaining pixel and/or sub-pixel.

Another aspect ("aspect sixty one") relates to the method of aspect sixty, wherein the material is configured to act as a color filter, the color filter being configured to increase an angle of observation of the optical image.

One aspect ("aspect sixty two") relates to an optical image that is instantly produced and different from other optical images produced in the same printing cycle, the optical image being prepared by a process comprising the steps of: obtaining a pre-prepared physical generic optical matrix having an arrayed motif of static physical pixels corresponding to color and sub-pixels corresponding to non-color effects, the pixels including first pixels corresponding to a first color and second pixels corresponding to a second color, the sub-pixels including first sub-pixels corresponding to a first non-color effect and second sub-pixels corresponding to a second non-color effect, wherein a given non-color effect corresponds to one or more of viewing angle, viewing distance, polarization, intensity, scattering, refractive index, or birefringence; and obliterating during a single printing cycle individual ones of the pixels and/or sub-pixels of the generic optical matrix according to a negative while preserving remaining pixels and/or sub-pixels, the remaining pixels and/or sub-pixels forming the optical image corresponding to a base image, the optical image being colored based on the remaining pixels, the optical image exhibiting non-color effects corresponding to the remaining sub-pixels, wherein obliterating a given pixel and/or sub-pixel includes one or more of printing a pigment over the given pixel and/or sub-pixel, curing a radiation-curable material over the given pixel and/or sub-pixel, chemical etching away the given pixel and/or sub-pixel, or laser ablating the given pixel and/or sub-pixel.

One aspect ("aspect sixty three") relates to a generic optical matrix having pixels corresponding to color and sub-pixels corresponding to non-color effects, the generic optical matrix comprising: a substrate; and an array of pixels disposed on the substrate, the array comprising first pixels corresponding to a first color and second pixels corresponding to a second color, the first color being different from the second color, the first pixels and second pixels being arranged in a motif such that individual ones of the first pixels are positioned adjacent to individual ones of the second pixels; wherein individual ones of the pixels comprise sub-pixels, a given pixel comprising a first sub-pixel and a second sub-pixel, the first sub-pixel comprising a first optical structure configured such that light reflected or transmitted by the optical structure of the first sub-pixel is directed toward a left eye of a person observing the generic optical matrix from the first viewing distance, the second sub-pixel comprising a second optical structure configured such that light reflected or transmitted by the optical structure of the second sub-pixel is directed toward a right eye of the person observing the generic optical matrix from the first viewing distance, the light reflected or transmitted by the first sub-pixel and the second sub-pixel being the corresponding color of the given pixel.

Another aspect ("aspect sixty four") relates to the generic optical matrix of aspect sixty three, wherein the substrate includes one or more of photoresist, nickel plate, polyester film, silicon, polycarbonate film, or ultraviolet substrate.

Another aspect ("aspect sixty five") relates to the generic optical matrix of aspect sixty three, wherein: the array further comprises third pixels corresponding to a third color; the third color is different from the first color and the second color; and the third pixels are arranged in the motif such that individual ones of the third pixels are positioned adjacent to individual ones of the first pixels and individual ones of the second pixels.

Another aspect ("aspect sixty six") relates to the generic optical matrix of aspect sixty five, wherein: the array further comprises fourth pixels corresponding to a fourth color; the fourth color is different from the first color, the second color, and the third color; and the fourth pixels are arranged in the motif such that individual ones of the fourth pixels are positioned adjacent to individual ones of the first pixels, individual ones of the second pixels, and individual ones of the third pixels.

Another aspect ("aspect sixty seven") relates to the generic optical matrix of aspect sixty three, wherein the given pixel comprises a third sub-pixel and a fourth sub-pixel, the third subpixel comprising a third optical structure configured such that light reflected or transmitted by the third optical structure of the third sub-pixel is directed toward a left eye of a person observing the generic optical matrix from a second viewing distance, the fourth sub-pixel comprising a fourth optical structure configured such that light reflected or transmitted by the fourth optical structure of the fourth sub-pixel is directed toward a right eye of the person observing the generic optical matrix from the second viewing distance, the light reflected or transmitted by the third sub-pixel and the fourth sub-pixel being the corresponding color of the given pixel.

Another aspect ("aspect sixty eight") relates to the generic optical matrix of aspect sixty three, wherein a given optical structure includes one or more of a grating, a hologram, a kinegram, a Fresnel lens, a diffractive optically variable image device, a pixelgram, a holographic stereogram, a diffraction identification device, a dielectric structure, a volume hologram, an interference security image structure, a computer-generated hologram, or an electron-beam grating.

Another aspect ("aspect sixty nine") relates to the generic optical matrix of aspect sixty three, wherein the array of pixels is arranged as one of a square lattice, a hexagonal lattice, triangular lattice, rectangular lattice, a random arrangement, or a pseudorandom arrangement.

Another aspect ("aspect seventy") relates to the generic optical matrix of aspect sixty three, wherein individual ones of the pixels are shaped as a circle, a square, a rectangle, a line, an oval, a rounded square, or dots.

Another aspect ("aspect seventy one") relates to the generic optical matrix of aspect sixty three, wherein the optical matrix covers an area with one linear dimension being in the range of 0.01 microns to 90 inches.

Another aspect ("aspect seventy two") relates to the generic optical matrix of aspect sixty three, wherein the array of pixels has a resolution in the range of one pixel per inch to 500,000 pixels per inch.

One aspect ("aspect seventy three") relates to a generic optical matrix having pixels corresponding to color and sub-pixels corresponding to non-color effects, the generic optical matrix comprising: a substrate; and an array of pixels disposed on the substrate, the array comprising first pixels corresponding to a first color and second pixels corresponding to a second color, the first color being different from the second color, the first pixels and second pixels being arranged in a motif such that individual ones of the first pixels are positioned adjacent to individual ones of the second pixels; wherein individual ones of the pixels comprise sub-pixels, a given pixel comprising a first sub-pixel and a second sub-pixel, the first sub-pixel comprising a first optical structure configured such that light reflected or transmitted by the optical structure of the first sub-pixel has a first polarization, the second sub-pixel comprising a second optical structure configured such that light reflected or transmitted by the optical structure of the second sub-pixel has a second polarization, the first polarization being different from the second polarization, the light reflected or transmitted by the first sub-pixel and the second sub-pixel being the corresponding color of the given pixel.

Another aspect ("aspect seventy four") relates to the generic optical matrix of aspect seventy three, wherein the substrate includes one or more of photoresist, nickel plate, polyester film, silicon, polycarbonate film, or ultraviolet substrate.

Another aspect ("aspect seventy five") relates to the generic optical matrix of aspect seventy three, wherein: the array further comprises third pixels corresponding to a third color; the third color is different from the first color and the second color; and the third pixels are arranged in the motif such that individual ones of the third pixels are positioned adjacent to individual ones of the first pixels and individual ones of the second pixels.

Another aspect ("aspect seventy six") relates to the generic optical matrix of aspect seventy five, wherein: the array further comprises fourth pixels corresponding to a fourth color; the fourth color is different from the first color, the second color, and the third color; and the fourth pixels are arranged in the motif such that individual ones of the fourth pixels are positioned adjacent to individual ones of the first pixels, individual ones of the second pixels, and individual ones of the third pixels.

Another aspect ("aspect seventy seven") relates to the generic optical matrix of aspect seventy three, wherein a given optical structure includes one or more of a grating, a hologram, a kinegram, a Fresnel lens, a diffractive optically variable image device, a pixelgram, a holographic stereogram, a diffraction identification device, a dielectric structure, a volume hologram, an interference security image structure, a computer-generated hologram, or an electron-beam grating.

Another aspect ("aspect seventy eight") relates to the generic optical matrix of aspect seventy three, wherein one or more of: the array of pixels is arranged as one of a square lattice, a hexagonal lattice, triangular lattice, rectangular lattice, a random arrangement, or a pseudorandom arrangement; individual ones of the pixels are shaped as a circle, a square, a rectangle, a line, an oval, a rounded square, or dots; the optical matrix covers an area with one linear dimension being in the range of 0.01 microns to 90 inches; or the array of pixels has a resolution in the range of one pixel per inch to 500,000 pixels per inch.

One aspect ("aspect seventy nine") relates to a method for fabricating a generic optical matrix having pixels corresponding to color and sub-pixels corresponding to non-color effects, the method comprising: obtaining a substrate; defining an array of pixels disposed on the substrate, the array comprising first pixels corresponding to a first color and second pixels corresponding to a second color, the first color being different from the second color, the first pixels and second pixels being arranged in a motif such that individual ones of the first pixels are positioned adjacent to individual ones of the second pixels; and forming sub-pixels within individual ones of the pixels, a given pixel comprising a first sub-pixel and a second sub-pixel, the first sub-pixel comprising a first optical structure configured such that light reflected or transmitted by the optical structure of the first sub-pixel is directed toward a left eye of a person observing the generic optical matrix from the first viewing distance, the second sub-pixel comprising a second optical structure configured such that light reflected or transmitted by the optical structure of the second sub-pixel is directed toward a right eye of the person observing the generic optical matrix from the first viewing distance, the light reflected or transmitted by the first sub-pixel and the second sub-pixel being the corresponding color of the given pixel.

Another aspect ("aspect eighty") relates to the method of aspect seventy nine, wherein: the array further comprises third pixels corresponding to a third color; the third color is different from the first color and the second color; and the third pixels are arranged in the motif such that individual ones of the third pixels are positioned adjacent to individual ones of the first pixels and individual ones of the second pixels.

Another aspect ("aspect eighty one") relates to the method of aspect seventy nine, wherein: the given pixel comprises a third sub-pixel and a fourth sub-pixel; the third sub-pixel comprises a third optical structure configured such that light reflected or transmitted by the third optical structure is directed toward a left eye of a person observing the generic optical matrix from a second viewing distance; the fourth sub-pixel comprises a fourth optical structure configured such that light reflected or transmitted by the fourth optical structure is directed toward a right eye of a person observing the generic optical matrix from the second viewing distance; and the light reflected or transmitted by the third sub-pixel and the fourth sub-pixel being the corresponding color of the given pixel.

One aspect ("aspect eighty two") relates to a method for fabricating a generic optical matrix having pixels corresponding to color and sub-pixels corresponding to non-color effects, the method comprising: obtaining a substrate; defining an array of pixels disposed on the substrate, the array comprising first pixels corresponding to a first color and second pixels corresponding to a second color, the first color being different from the second color, the first pixels and second pixels being arranged in a motif such that individual ones of the first pixels are positioned adjacent to individual ones of the second pixels; and forming sub-pixels within individual ones of the pixels, a given pixel comprising a first sub-pixel and a second sub-pixel, the first sub-pixel comprising a first optical structure configured such that light reflected or transmitted by the optical structure of the first sub-pixel has a first polarization, the second sub-pixel comprising a second optical structure configured such that light reflected or transmitted by the optical structure of the second sub-pixel has a second polarization, the first polarization being different from the second polarization, the light reflected or transmitted by the first sub-pixel and the second sub-pixel being the corresponding color of the given pixel.

One aspect ("aspect eighty three") relates to a system configured for fabricating variable digital optical images using generic optical matrices, the system comprising: an image negative component configured to retain a negative corresponding to a base image, the negative being based on the base image and a geometry associated with a generic optical matrix, the generic optical matrix having pixels corresponding to color and sub-pixels corresponding to non-color effects. the pixels including first pixels corresponding to a first color and second pixels corresponding to a second color. The sub-pixels including first sub-pixels corresponding to a first non-color effect and second sub-pixels corresponding to a second non-color effect, the geometry indicating locations and colors of pixels in the generic optical matrix, the geometry further indicating locations and non-color effects of sub-pixels within the pixels; and an image generation component configured to obliterate individual ones of the pixels and/or sub-pixels of the generic optical matrix according to the negative while preserving remaining pixels and/or sub-pixels, the remaining pixels and/or sub-pixels forming an optical image corresponding to the base image, the optical image being colored based on the remaining pixels, the optical image exhibiting non-color effects corresponding to the remaining sub-pixels; wherein the negative is in an electronic format; and wherein the image generation component includes an apparatus configured to print ink or toner directly on the generic optical matrix such that pixels and/or sub-pixels that are printed over become obliterated.

Another aspect ("aspect eighty four") relates to the system of aspect eighty three, wherein the optical image comprises one or more of a hologram, a stereo image, a hologram, a stereo image, an optically variable device based image, a diffractive optically variable image, a zero order device based image, a blazed diffraction structure based image, a first order device based image, a dot matrix image, a pixelgram image, a structural color structure based image, a diffractive identification device based image, an interference security image structure based image, a kinegram image, an excelgram image, a diffractive optical element based image, a photonic structure based image, a nanohole based image, a computer generated hologram, an electron-beam generated optical structure, or an interference patterns.

Another aspect ("aspect eighty five") relates to the system of aspect eighty three, wherein the non-color effects of the remaining sub-pixels give rise to one or more optical effects observable when viewing the optical image, the one or more optical effects including one or more of a three-dimensional optical effect, a two-dimensional optical effect, a dynamic optical effect, a scattering effect, a holographic white effect, a lens effect, a Fresnel lens effect, a brightness modulation effect, a lithographic effect, a stereogram effect, a nanotext and/or microtext effect, a hidden image effect, a moire effect, a concealed animated pattern effect, a covert laser readable (CLR) effect, a multiple background effect, a pearlescent effect, a true color image effect, a guilloche effect, an animation effect, an achromatic Fresnel effect, a dynamic CLR image, a kinematic images, a full parallax effect, a scratch holographic effect, a polarizing effect, a watermark effect, a metallic effect, a binary optical structure, or a Fresnel prism.

Another aspect ("aspect eighty six") relates to the system of aspect eighty three, wherein individual ones of the remaining sub-pixels reflect light at a specific viewing angle with a color corresponding to that of the individual pixels associated with the remaining sub-pixels.

Another aspect ("aspect eighty seven") relates to the system of aspect eighty three, wherein the physical substrate is a transparent film.

Another aspect ("aspect eighty eight") relates to the system of aspect eighty three, further comprising an aligner component configured to align registration of the negative based on one or more registration marks associated with the generic optical matrix.

Another aspect ("aspect eighty nine") relates to the system of aspect eighty three, wherein the ink or toner includes a radiation curable material, the radiation curable material having an index of refraction, when cured, that is the same as or similar to an index of refraction of the generic optical matrix.

Another aspect ("aspect ninety") relates to the system of aspect eighty nine, wherein the radiation curable material is one or more of: a lacquer that is cured when exposed to ultraviolet light; transparent or translucent when cured; or colored when cured.

Another aspect ("aspect ninety one") relates to the system of aspect eighty three, wherein individual obliterated pixels and/or sub-pixels are rendered transparent, the obliterated pixels and/or sub-pixels rendered transparent allowing a substrate of the generic optical matrix to be visible at the obliterated pixels and/or sub-pixels rendered transparent.

Another aspect ("aspect ninety two") relates to the system of aspect eighty three, wherein the image generation component is further configured to print black over individual ones of the obliterated pixels and/or sub-pixels.

Another aspect ("aspect ninety three") relates to the system of aspect eighty three, wherein the image generation component is further configured to print black at various densities over individual ones of the remaining pixels and/or sub-pixels to affect a brightness of the individual ones of the remaining pixels and/or sub-pixels.

Another aspect ("aspect ninety four") relates to the system of aspect eighty three, wherein the negative is modifiable such that successively generated optical images are variable in that individual optical images are different from other optical images.

Another aspect ("aspect ninety five") relates to the system of aspect ninety four, wherein the optical image and the successive optical images include a variable code that is different for different optical images, the variable codes including one or more of a linear barcode, a matrix barcode, an alphanumeric code, a graphical code, a 2D code, sequential barcodes, sequential numbers, an encrypted code, a datamatrix code, a matrix 2D code, an Aztec code, or a maxi code.

Another aspect ("aspect ninety six") relates to the system of aspect ninety four, wherein the optical image and the successive optical images include one or both of a variable overt security feature or a variable covert security feature.

One aspect ("aspect ninety seven") relates to a method for fabricating variable digital optical images using generic optical matrices, the method comprising: retaining a negative corresponding to a base image, the negative being based on the base image and a geometry associated with a generic optical matrix, the generic optical matrix having pixels corresponding to color and sub-pixels corresponding to noncolor effects. the pixels including first pixels corresponding to a first color and second pixels corresponding to a second color. the sub-pixels including first sub-pixels corresponding to a first non-color effect and second sub-pixels corresponding to a second non-color effect, the geometry indicating locations and colors of pixels in the generic optical matrix, the geometry further indicating locations and non-color effects of sub-pixels within the pixels; and obliterating individual ones of the pixels and/or sub-pixels of the generic optical matrix according to the negative while preserving remaining pixels and/or sub-pixels, the remaining pixels and/or sub-pixels forming an optical image corresponding to the base image, the optical image being colored based on the remaining pixels, the optical image exhibiting non-color effects corresponding to the remaining sub-pixels; wherein the negative is in an electronic format, the negative being modifiable such that successively generated optical images are variable in that individual optical images are different from other optical images; and wherein obliterating the individual ones of the pixels and/or sub-pixels includes printing ink or toner directly on the generic optical matrix such that pixels and/or subpixels that are printed over become obliterated.

Another aspect ("aspect ninety eight") relates to the method of aspect ninety seven, further comprising aligning registration marks of the negative based on one or more registration marks associated with the generic optical matrix, wherein a given registration mark is included in the generic optical matrix.

Another aspect ("aspect ninety nine") relates to the method of aspect ninety seven, wherein the ink or toner includes a radiation curable material between the negative and the generic optical matrix, the radiation curable material having an index of refraction, when cured, that is the same as or similar to an index of refraction of the generic optical matrix.

Another aspect ("aspect one hundred") relates to the method of aspect ninety seven, further comprising overprinting remaining pixels and/or sub-pixels with a material having a first refractive index, the first refractive index being higher than a refractive index of an optical structure of a given remaining pixel and/or sub-pixel.

Another aspect ("aspect one hundred one") relates to the method of aspect one hundred, wherein the material is configured to act as a color filter, the color filter being configured to increase an angle of observation of the optical image.

One aspect ("aspect one hundred two") relates to an optical image prepared by a process comprising the steps of: obtaining a generic optical matrix having pixels corresponding to color and sub-pixels corresponding to non-color effects, the pixels including first pixels corresponding to a first color and second pixels corresponding to a second color, the sub-pixels including first sub-pixels corresponding to a first non-color effect and second sub-pixels corresponding to a second non-color effect; and obliterating individual ones of the pixels and/or sub-pixels of the generic optical matrix according to a negative while preserving remaining pixels and/or sub-pixels, the remaining pixels and/or sub-pixels forming the optical image corresponding to a base image, the optical image being colored based on the remaining pixels, the optical image exhibiting non-color effects corresponding to the remaining sub-pixels; wherein the negative is in an electronic format, the negative being modifiable such that successively generated optical images are variable in that individual optical=images are different from other optical images; and wherein obliterating the individual ones of the pixels and/or sub-pixels includes printing ink or toner directly on the generic optical matrix such that pixels and/or subpixels that are printed over become obliterated.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A generic optical matrix on which an optical image can be fabricated, the generic optical matrix comprising:
    a substrate; and
    an arrayed motif of static physical pixels disposed on the substrate; at least a subset of said pixels being positioned within a print area on the substrate, the arrayed motif comprising first pixels corresponding to a first color, the first pixels are arranged on the substrate in known locations;
    wherein individual ones of the first pixels comprise sub-pixels, a given first pixel comprising a first sub-pixel and a second sub-pixel, the first sub-pixel comprising a first optical structure configured such that light reflected or transmitted by the first optical structure of the first sub-pixel is directed away from the substrate at a first viewing angle, the light reflected or transmitted by the first sub-pixel and the second sub-pixel being the corresponding color of the given pixel.

2. The generic optical matrix of claim 1, wherein the substrate includes one or more of photoresist, nickel plate, polyester film, silicon, polycarbonate film, or ultraviolet substrate.

3. The generic optical matrix of claim 1, wherein a given optical structure includes one or more of a grating, a hologram, a kinegram, a Fresnel lens, a diffractive optically variable image device, a pixelgram, a holographic stereogram, a diffraction identification device, a dielectric structure, a volume hologram, an interference security image structure, a computer-generated hologram, or an electron-beam grating.

4. The generic optical matrix of claim 1 wherein:
    the arrayed motif of static physical pixels disposed on the substrate further comprises second pixels corresponding to a second color; the second color being different from the first color; the second pixels being positioned in known locations on the substrate;
    wherein individual ones of the second pixels comprise sub-pixels, a given second pixel comprises a second optical structure configured such that light reflected or transmitted by the second optical structure of the second sub-pixel is directed away from the substrate in a second direction.

5. The generic optical matrix of claim 4, wherein individual ones of said second pixels comprise a third sub-pixel and a fourth sub-pixel, the third sub-pixel comprising a third optical structure configured such that light reflected or transmitted by the third optical structure of the third sub-pixel is directed away from the substrate generally at the first angle, the fourth sub-pixel comprising a fourth optical structure configured such that light reflected or transmitted by the fourth optical structure of the fourth sub-pixel is directed away from the substrate generally at the second angle, the light reflected or transmitted by the third sub-pixel and the fourth sub-pixel being the corresponding color of the given pixel.

6. The generic optical matrix of claim 4, wherein:
the arrayed motif of static physical pixels disposed on the substrate further comprises third pixels corresponding to a third color;
the third color is different from the first color and the second color; and
the third pixels are arranged on the substrate in known locations such that individual ones of the third pixels are positioned adjacent to individual ones of the first pixels and individual ones of the second pixels.

7. The generic optical matrix of claim 6, wherein:
the arrayed motif of static physical pixels disposed on the substrate further comprises fourth pixels corresponding to a fourth color;
the fourth color is different from the first color, the second color, and the third color; and
the fourth pixels are arranged on the substrate in known locations such that individual ones of the fourth pixels are positioned adjacent to individual ones of the first pixels, individual ones of the second pixels, and individual ones of the third pixels.

8. The generic optical matrix of claim 1, wherein the arrayed motif of static physical pixels disposed on the substrate is arranged as one of a square lattice, a hexagonal lattice, triangular lattice, rectangular lattice, a random arrangement, or a pseudorandom arrangement.

9. The generic optical matrix of claim 1, wherein individual ones of the pixels are shaped as a circle, a square, a rectangle, a line, an oval, a rounded square, or dots.

10. The generic optical matrix of claim 1, wherein the optical matrix covers an area with one linear dimension being in the range of 0.01 microns to 90 inches.

11. The generic optical matrix of claim 1, wherein the array of pixels has a resolution in the range of one pixel per inch to 500,000 pixels per inch.

* * * * *